(12) United States Patent
Amimoto

(10) Patent No.: US 10,951,948 B2
(45) Date of Patent: Mar. 16, 2021

(54) SIGNAL PROCESSING APPARATUS AND METHOD

(71) Applicant: SONY CORPORATION, Tokyo (JP)

(72) Inventor: Tatsuki Amimoto, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/761,293

(22) PCT Filed: Oct. 14, 2016

(86) PCT No.: PCT/JP2016/080469
§ 371 (c)(1),
(2) Date: Mar. 19, 2018

(87) PCT Pub. No.: WO2017/073351
PCT Pub. Date: May 4, 2017

(65) Prior Publication Data
US 2018/0262802 A1  Sep. 13, 2018

(30) Foreign Application Priority Data

Oct. 29, 2015 (JP) .............................. JP2015-212449

(51) Int. Cl.
H04N 21/443 (2011.01)
H04N 21/426 (2011.01)

(52) U.S. Cl.
CPC ....... *H04N 21/4436* (2013.01); *H04N 21/426* (2013.01); *H04N 21/42607* (2013.01)

(58) Field of Classification Search
CPC .... H04N 21/4436; H04N 21/426; H04J 11/00

USPC .......................................................... 725/151
See application file for complete search history.

(56) References Cited

U.S. PATENT DOCUMENTS

| 2006/0056546 A1 | 3/2006 | Hayase et al. | |
| 2006/0165190 A1* | 7/2006 | Tamaki | H04L 1/0003 375/262 |
| 2009/0207927 A1* | 8/2009 | Watanabe | H04B 7/0871 375/260 |

(Continued)

FOREIGN PATENT DOCUMENTS

| CN | 1750525 A | 3/2006 |
| CN | 101461160 A | 6/2009 |

(Continued)

OTHER PUBLICATIONS

International Search Report and Written Opinion of PCT Application No. PCT/JP2016/080469, dated Nov. 22, 2016, 09 pages.

(Continued)

*Primary Examiner* — Nnenna N Ekpo
(74) *Attorney, Agent, or Firm* — Chip Law Group

(57) ABSTRACT

The present technique relates to signal processing apparatus and method that can reduce power consumption. A receiver that receives a broadcast signal includes a demodulation unit that demodulates the broadcast signal, and a reception control unit that controls the demodulation by the demodulation unit. In a section not including PLPs to be received in the broadcast signal, the reception control unit controls the demodulation unit to stop the demodulation by the demodulation unit on the basis of subframes or OFDM symbols. The present technique can be applied to a receiver.

14 Claims, 21 Drawing Sheets

(56) References Cited

U.S. PATENT DOCUMENTS

| | | | |
|---|---|---|---|
| 2015/0208208 A1* | 7/2015 | You | H04W 72/005 370/312 |
| 2017/0013274 A1* | 1/2017 | Sadhwani | H04N 19/164 |
| 2017/0094480 A1* | 3/2017 | Kwon | H04J 11/00 |

FOREIGN PATENT DOCUMENTS

| | | | | |
|---|---|---|---|---|
| CN | 103444199 A | 12/2013 | | |
| EP | 2685649 A1 * | 1/2014 | | H04N 21/4382 |
| EP | 2685649 A1 | 1/2014 | | |
| JP | 2006-081045 A | 3/2006 | | |
| JP | 2012-191505 A | 10/2012 | | |
| KR | 10-2006-0024309 A | 3/2006 | | |
| KR | 10-2009-0024125 A | 3/2009 | | |
| RU | 2013140839 A | 3/2015 | | |
| WO | 2007/144978 A1 | 12/2007 | | |

OTHER PUBLICATIONS

"ATSC Candidate Standard: Physical Layer Protocol", Advanced Television Systems Committee, Doc. S32-230r21 Sep. 28, 2015, 228 pages.

"ATSC Standard: Physical Layer Protocol (A/322)", Advanced Television Systems Committee, Doc. A/322:2017, Jun. 6, 2017, 262 pages.

* cited by examiner

SIGNAL PROCESSING APPARATUS AND METHOD

CROSS REFERENCE TO RELATED APPLICATIONS

This application is a U.S. National Phase of International Patent Application No. PCT/JP2016/080469 filed on Oct. 14, 2016, which claims priority benefit of Japanese Patent Application No. JP 2015-212449 filed in the Japan Patent Office on Oct. 29, 2015. Each of the above-referenced applications is hereby incorporated herein by reference in its entirety.

TECHNICAL FIELD

The present technique relates to signal processing apparatus and method, and a program, and particularly, to signal processing apparatus and method, and a program that can reduce power consumption.

BACKGROUND ART

In DVB (Digital Video Broadcasting)-T2 that is a broadcast standard, there is a known mechanism of inserting a frame called FEF (Future Extension Frame) into a signal that transmits contents and stopping demodulation in the entire frame in a case where a receiver side determines that the frame is not to be received based on the FEF (for example, see PTL 1).

In contrast with the DVB-T2, a processing unit called subframes is added in ATSC (Advanced Television Systems Committee) 3.0 that is a new broadcast standard, and a mechanism that can transmit contents by providing different robustness to each subframe is adopted (for example, see NPL 1).

Multiplexing and transmitting a plurality of services, such as video, sound, and metadata, are also suggested in the ATSC 3.0 standard. Furthermore, each service is multiplexed and transmitted on the basis of so-called PLP (Physical Layer Pipe) in the ATSC 3.0 standard, and it is also suggested that a receiver requires 4 PLP decoding that can decode PLPs of video, sound, robust sound, and metadata.

CITATION LIST

Patent Literature

[PTL 1]
JP 2012-191505A

Non Patent Literature

[NPL 1]
Advanced Television Systems Committee, "ATSC Candidate Standard: Physical Layer Protocol," Doc. 532-230r21, 28 Sep. 2015

SUMMARY

Technical Problems

Incidentally, receiving a plurality of services at the same time is actually a rare case regarding the ATSC 3.0 standard. Furthermore, depending on static restrictions or dynamic restrictions of hardware on the decoding side of the services, there can be a situation that part of the received PLPs is not used, such as where only a video in the contents is to be viewed, where the contents are to be viewed with robust sound, and where a video is to be viewed at a low rate, for example.

Here, examples of the static restrictions of hardware include the number of PLPs that can be decoded at the same time as well as the number and the presence of output IFs (Interfaces) for video, sound, metadata, and the like. Specifically, there is a case in which a device on the decoding side can output stereo sound, but does not support sound output of 5.1 ch, for example.

Also, examples of the dynamic restrictions of hardware include a state of battery and a state of processing load in a mobile device on the decoding side. Specifically, there is a case in which a process different from the process for viewing the contents is executed in the mobile device, and there is no room for allocating power supply to the receiver of the contents, for example.

Therefore, the power consumption needs to be further reduced in the mobile device, and furthermore, the receiver needs to respond to dynamic changes in demand in the mobile device.

The present technique has been made in view of the circumstances, and the present technique is designed to reduce power consumption.

Solution to Problems

An aspect of the present technique provides a signal processing apparatus including a demodulation unit that demodulates a received signal including a plurality of pieces of multiplexed data, and a reception control unit that stops the demodulation by the demodulation unit in a section not including necessary data in the received signal on the basis of subframes or OFDM symbols constituting a frame of the received signal.

The signal processing apparatus can further include an extraction unit that extracts, from the received signal, signaling information for specifying arrangement of the data in the received signal, and the reception control unit can decide the section for stopping the demodulation on the basis of the signaling information.

The reception control unit can stop the demodulation by stopping at least part of a process in the demodulation unit.

The reception control unit can stop the demodulation by stopping supply of a clock supplied to at least part of the demodulation unit or by reducing a frequency of the clock.

The reception control unit can stop the demodulation by stopping supply of a power source supplied to at least part of the demodulation unit or by reducing a voltage of the power source.

The reception control unit can reduce a frequency of a clock supplied to the reception control unit in the section for stopping the demodulation.

The reception control unit can reduce a voltage of a power source supplied to the reception control unit in the section for stopping the demodulation.

In a section not including necessary data just in front of a section for performing the demodulation, the reception control unit can cause the demodulation unit to execute, as a demodulation preliminary operation, at least one of a process of correcting a phase error of the received signal and a process of estimating transmission path characteristics of the received signal among processes of demodulating the received signal.

The reception control unit can decide a length of the section of the demodulation preliminary operation on the basis of at least one of an estimation result of the transmission path characteristics and an estimation result of noise included in the received signal.

In a case where the reception control unit causes the demodulation unit to execute the demodulation preliminary operation, the reception control unit can stop supply of a clock to a later-stage block in a later stage of a block that executes the demodulation preliminary operation in the demodulation unit or reduce a frequency of the clock supplied to the later-stage block.

In the case where the reception control unit causes the demodulation unit to execute the demodulation preliminary operation, the reception control unit can stop supply of power source to a later-stage block in a later stage of a block that executes the demodulation preliminary operation in the demodulation unit or reduce a voltage of the power source supplied to the later-stage block.

The reception control unit can control the demodulation unit to stop a process applied to the received signal that is an analog signal among processes of demodulating the received signal in the section for stopping the demodulation.

After controlling the demodulation unit to stop, in the section for stopping the demodulation, the process applied to the received signal that is the analog signal, the reception control unit can cause the demodulation unit to execute, in a section with a predetermined time length up to an end of the section for stopping the demodulation, the process applied to the received signal that is the analog signal.

An aspect of the present technique provides a signal processing method or a program including the steps of demodulating a received signal including a plurality of pieces of multiplexed data, and stopping the demodulation by the demodulation unit in a section not including necessary data in the received signal on the basis of subframes or OFDM symbols constituting a frame of the received signal.

In an aspect of the present technique, a received signal including a plurality of pieces of multiplexed data is demodulated, and the demodulation by the demodulation unit is stopped in a section not including necessary data in the received signal on the basis of subframes or OFDM symbols constituting a frame of the received signal.

Advantageous Effect of Invention

According to the aspect of the present technique, the power consumption can be reduced.

Note that the advantageous effect described here may not be limited, and the present technique can have any advantageous effects described in the present disclosure.

DESCRIPTION OF EMBODIMENTS

Hereinafter, embodiments of the present technique will be described with reference to the drawings.

First Embodiment

<Present Technique>

The present technique is designed to selectively process a desirable broadcast signal among time-multiplexed and transmitted broadcast signals of contents to thereby enable to reduce the power consumption.

In the present technique, at the reception of multiplexed and transmitted signals of services, such as sound, video, and metadata constituting a plurality of contents, subframes or OFDM (Orthogonal Frequency Division Multiplexing) symbols storing contents to be received are specified, and a demodulation unit is operated on the basis of the subframes or the OFDM symbols. Also, in unnecessary sections not storing the contents to be received, operations, such as stopping a demodulation function, shutting off a clock, reducing a clock frequency, shutting off a power source, and reducing a supply voltage, are appropriately performed, and a receiver that receives the broadcast signals can be driven at low power consumption.

Furthermore, the present technique is provided with a demodulation preliminary operation section for correcting a clock error and estimating a transmission path before the return from the shut-off of the clock or the power source. This can minimize the clock error caused by a change in the characteristics of the crystal due to a temperature change in the chip resulted from the shut-off of the clock or the power source and can minimize the deterioration of the performance caused by variations in the transmission path characteristics during the shut-off of the clock or the power source.

Hereinafter, the present technique will now be described more specifically. Note that the description will be continued by illustrating an example in which the present technique is applied to a receiver that receives broadcast signals compliant with an ATSC 3.0 standard. Although the broadcast signals are modulated by an OFDM system in the example described below, the broadcast signals may be modulated by other digital modulation systems.

Figure 1:
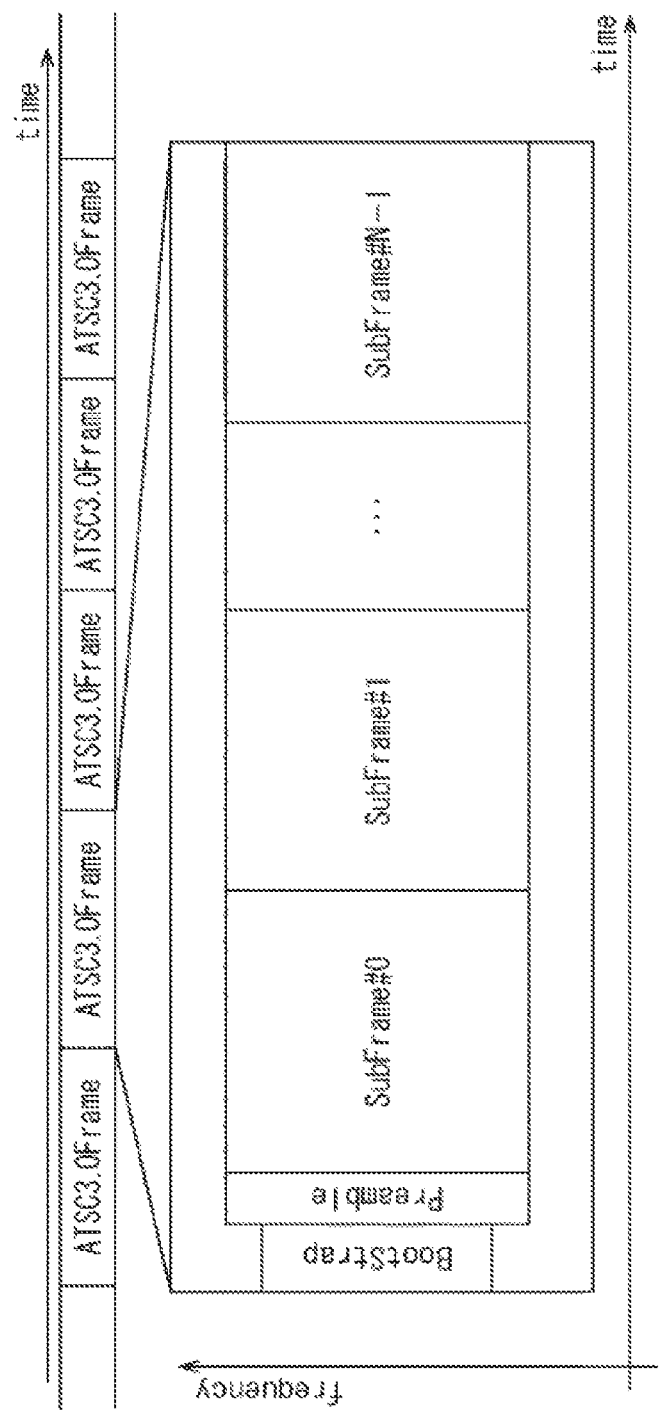
FIG. 1 is a diagram describing a structure of a broadcast signal.

In the ATSC 3.0 standard, the broadcast signals for transmitting a video, sound, metadata, and the like constituting the contents include a plurality of ATSC 3.0 frames as depicted in FIG. 1.

In FIG. 1, the horizontal direction in the drawing denotes time, and the vertical direction denotes frequency. In the example, one rectangle provided with a character "ATSC3.0 Frame" indicates one ATSC 3.0 frame (hereinafter, simply referred to as frame).

In addition, each frame includes a bootstrap signal, a preamble signal, and subframes (subframe signals).

In FIG. 1, a rectangle provided with a character "BootStrap" indicates the bootstrap signal, and a rectangle provided with a character "Preamble" indicates the preamble signal. In addition, rectangles provided with respective characters "SubFrame #0" to "SubFrame #N−1" indicate the subframes.

In each frame, the bootstrap signal is arranged at the top, and the preamble signal is arranged following the bootstrap signal. One or a plurality of subframes are further arranged after the preamble signal.

Here, the bootstrap signal is a signal for detecting the top of the frame in the broadcast signal, and information indicating the configuration of information of the preamble signal is written in the bootstrap signal. Therefore, the receiver can analyze the bootstrap signal to decipher the preamble signal.

The preamble signal is a signal also provided with information indicating the configuration of information of each subframe. For example, the receiver can analyze the preamble signal to specify the type of parameters that modulate the subframes.

Figure 2:
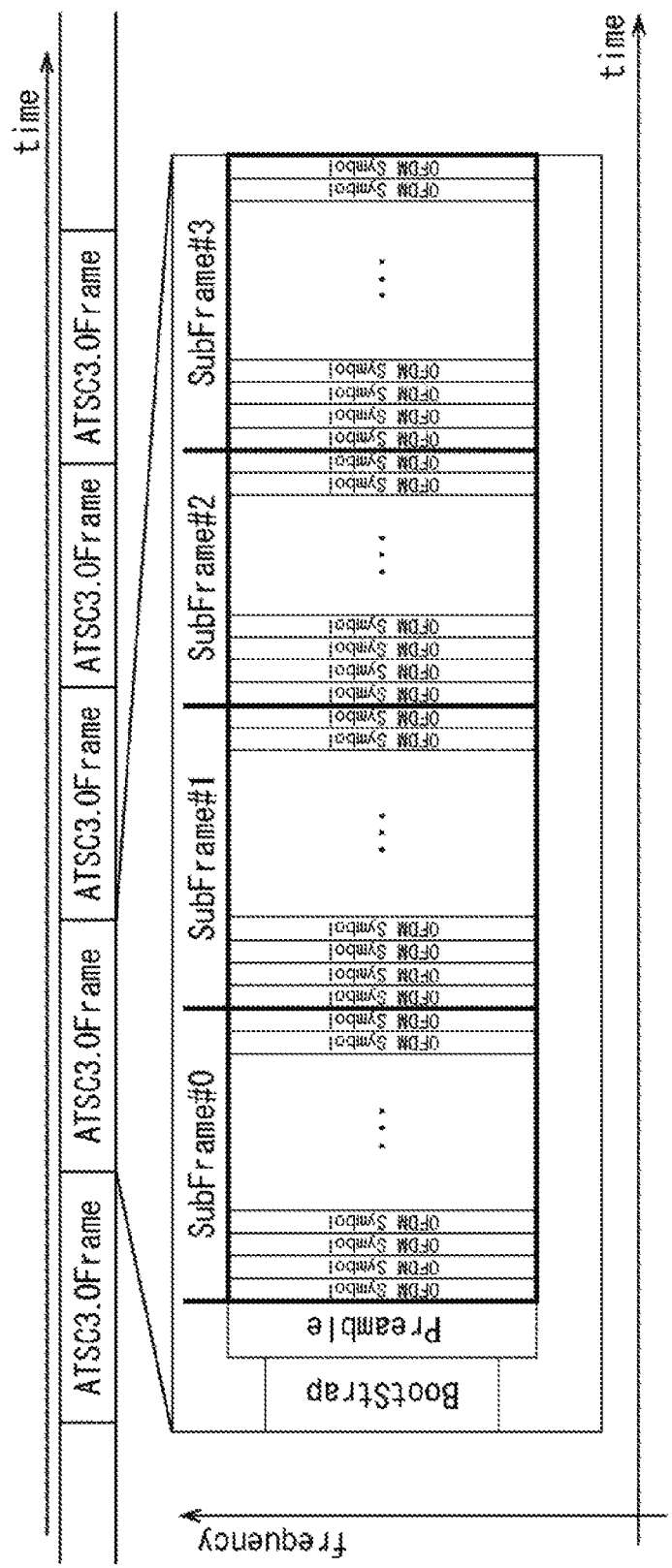
FIG. 2 is a diagram describing a structure of an ATSC 3.0 frame.

Furthermore, each subframe includes a plurality of OFDM symbols as depicted for example in FIG. 2. Note that in FIG. 2, the same characters are provided to the parts corresponding to the case of FIG. 1, and the description will be appropriately omitted.

In FIG. 2, it can be understood that a rectangle provided with a character "OFDM Symbol" indicates one OFDM symbol, and the subframe includes a plurality of OFDM symbols lined up in the time direction. In the subframe, one OFDM symbol is arranged for each time period.

Further, the OFDM symbol includes data cells corresponding to frequencies (subcarriers) lined up in the frequency direction. Various types of data, such as video data, sound data, and metadata constituting the contents, are stored in the data cells.

Particularly, the services, such as video, sound, and metadata, of the ATSC 3.0 standard are multiplexed on the basis of so-called PLPs including a plurality of data cells, and the services are stored in the subframes. More specifically, the data constituting the PLPs is also stored in part of the preamble signal.

Each PLP may be set across a plurality of OFDM symbols instead of one OFDM symbol. More specifically, as depicted for example in FIG. 3, each service is multiplexed by time division multiplexing, frequency division multiplexing, or a combination of these, and the service is transmitted by a broadcast signal. Note that in FIG. 3, the same characters are provided to the parts corresponding to the case of FIG. 1, and the description will be appropriately omitted.

Figure 3:
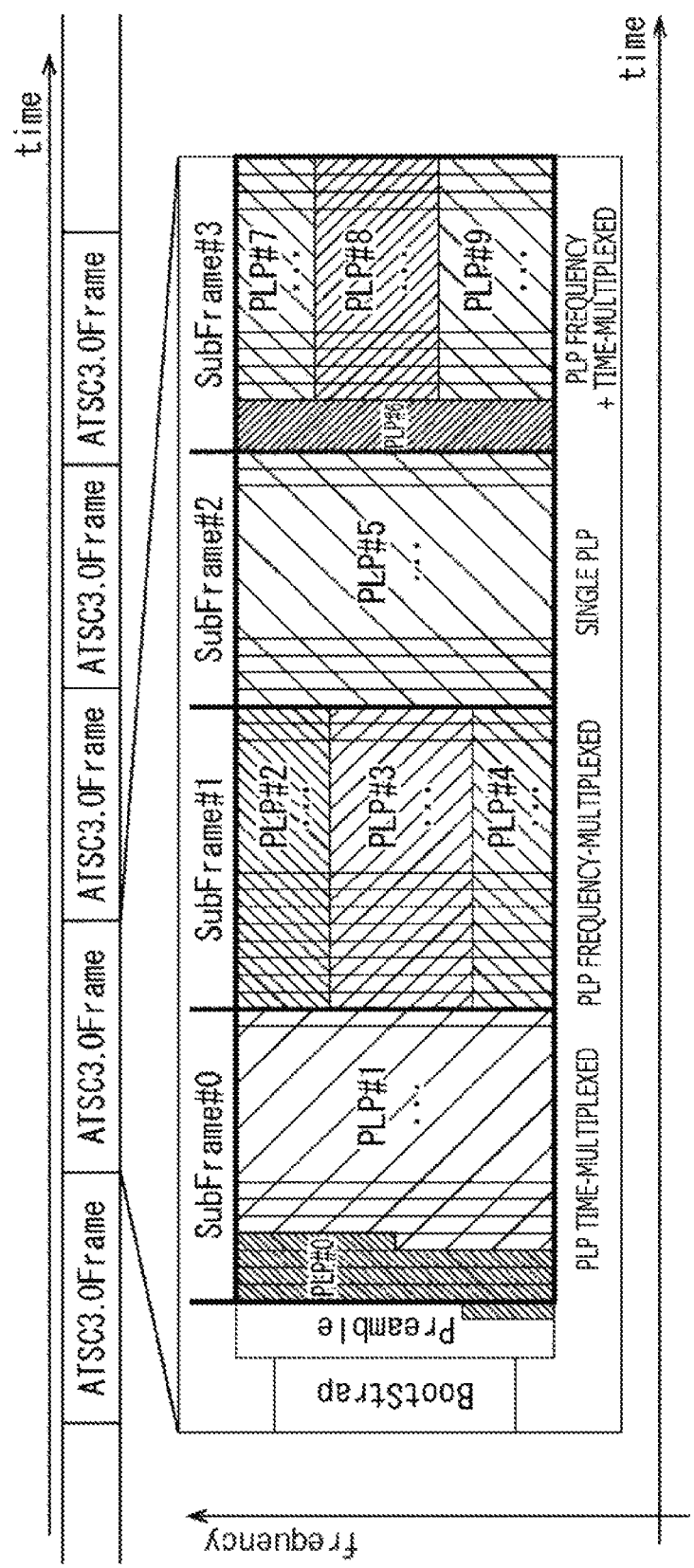
FIG. 3 is a diagram describing a PLP structure.

In FIG. 3, areas provided with respective characters "PLP #0" to "PLP #9" in the subframes indicate PLPs including a plurality of data cells.

In the example, an area (data) including part of the end of the preamble signal, first three OFDM symbols of a subframe #0 provided with a character "SubFrame #0," and part of a fourth OFDM symbol of the subframe #0 form the PLP #0 that is one PLP. Also, in the subframe #0, the part other than the PLP #0 forms the PLP #1, and it can be understood that time division multiplexing is applied to the PLPs (services) in the subframe #0.

On the other hand, an area (data) including data cells lined up in the time direction in a frequency band with a predetermined width is one PLP in a subframe #1 provided with a character "SubFrame #1," and the subframe #1 is divided into three PLPs #2 to #4. Therefore, each OFDM symbol includes a data cell constituting the PLP #2, a data cell constituting the PLP #3, and a data cell constituting the PLP #4. In this way, frequency division multiplexing is applied to the PLPs (services) in the subframe #1.

Further, in a subframe #2 provided with a character "SubFrame #2," one PLP #5 is constituted by all OFDM symbols in the subframe #2.

In a subframe #3 provided with a character "SubFrame #3," one PLP #6 is constituted by top three OFDM symbols. The part including the rest of the OFDM symbols is divided into three bands, and the respective band parts form PLPs #7 to #9. Therefore, time division multiplexing and frequency division multiplexing are applied to the PLPs (services) in subframe #3.

It is known that the receiver that receives the broadcast signal configured as described above demodulates the received broadcast signal and then selectively decodes and processes only PLPs storing necessary services among the multiplexed PLPs.

In this case, in the receiver, only necessary PLPs are the processing targets in the decoding, but all sections of the frames are the processing targets in the demodulation. Therefore, the demodulation process is applied to all sections of the frames.

Figure 4:
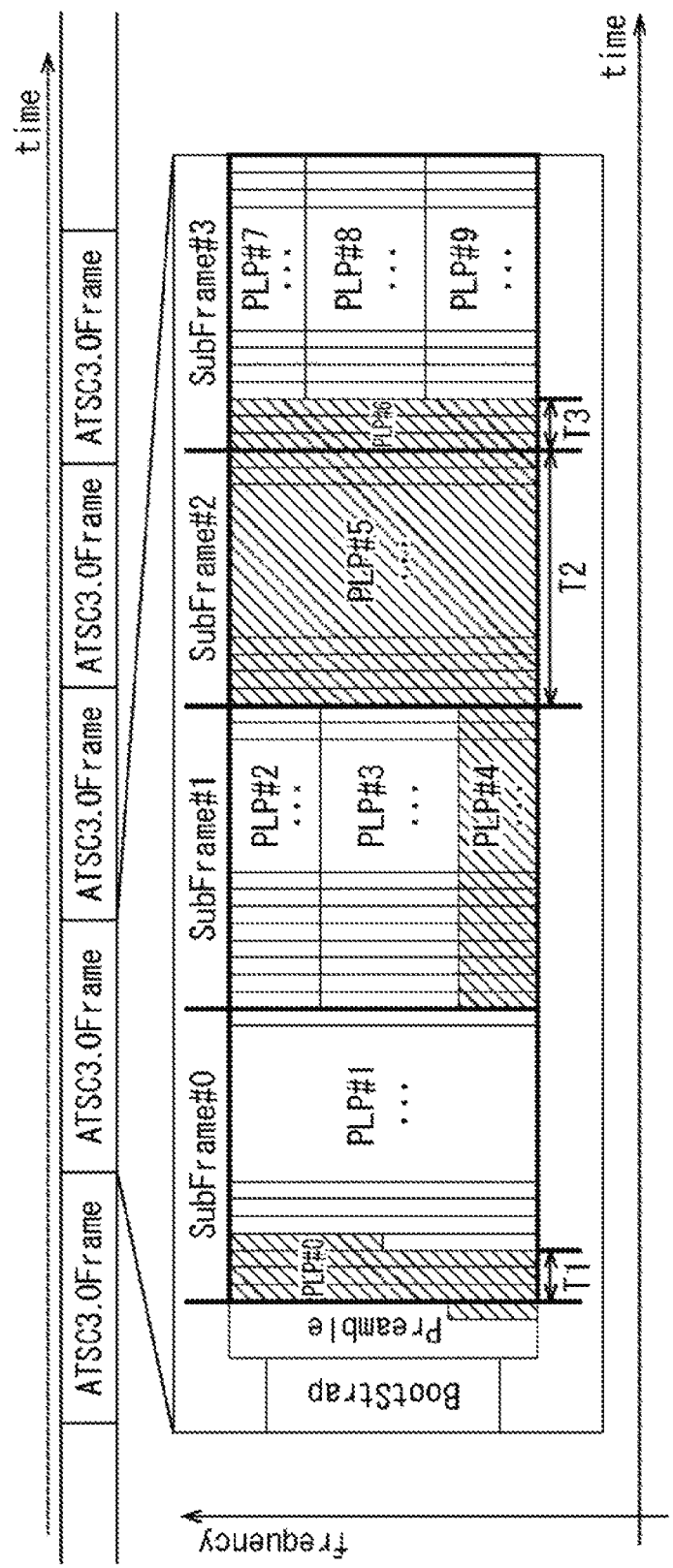
FIG. 4 is a diagram describing PLPs and services to be received.

However, when the PLPs included in the broadcast signal are observed on the basis of subframes or OFDM symbols, there are subframes and OFDM symbols not including necessary services, that is, not including services to be taken out from the broadcast signal, as depicted for example in FIG. 4. Note that in FIG. 4, the same characters are provided to the parts corresponding to the case of FIG. 3, and the description will be appropriately omitted.

In the example depicted in FIG. 4, four PLPs, PLP #0 and PLPs #4 to #6 provided with diagonal lines, of ten PLPs #0 to #9 are the PLPs not including the services to be taken out.

In this case, a section T1 including only the OFDM symbols constituting the PLP #0, a section T2 including only the OFDM symbols constituting the PLP #5, and a section T3 including only the OFDM symbols constituting the PLP #6 are sections not including the data to be received, that is, not including the necessary data. Therefore, the sections T1 to T3 are sections that do not always have to be demodulated.

On the other hand, although the subframe #1 includes the PLP #4 that is unnecessary, the subframe #1 also includes the PLP #2 and the PLP #3 storing data to be received, for example. Therefore, the subframe #1 is a section that needs to be demodulated.

In this way, in the ATSC 3.0 standard in which the frames include a plurality of subframes, and time division multiplexing or frequency division multiplexing is applied to the respective services, that is, PLPs, in each subframe, there are sections that do not always have to be demodulated when the entire frames are observed on the basis of subframes or OFDM symbols. Therefore, the demodulation of the broadcast signal can be controlled on the basis of subframes or OFDM symbols to reduce the power consumption of the receiver in the present technique.

More specifically, a demodulation stopping process is executed on the basis of frames of broadcast signal in, for example, DVB-T2 that is a terrestrial digital broadcasting standard for Europe. On the other hand, mapping information of PLPs included in the preamble signal not usually used by the demodulation unit that executes the demodulation process is also utilized in the demodulation unit in the present technique, and the demodulation stopping process is executed in sections on the basis of subframes or OFDM symbols that are units smaller than in the case of DVB-T2. In this way, the power consumption is further reduced.

Here, the demodulation stopping process by the demodulation unit executed in the receiver is one of the following processes PR1 to PR5 or an arbitrary combination of the processes. In other words, at least one of the following processes PR1 to PR5 is executed as a demodulation stopping process in the receiver.
(Process PR1)
A function stopping process, such as stopping the supply of data obtained from a broadcast signal to a predetermined block in the demodulation unit and stopping the firing of a start trigger for executing the process during demodulation
(Process PR2)
A clock supply stopping process of stopping (shutting off) the supply of a clock to at least part of the demodulation unit
(Process PR3)
A clock frequency reduction process of reducing (lowering) the frequency of a clock supplied to at least part of the demodulation unit
(Process PR4)
A power supply stopping process of stopping (shutting off) the supply of power (power source) to at least part of the demodulation unit
(Process PR5)
A power supply voltage reduction process of reducing (lowering) the voltage of the power source supplied to at least part of the demodulation unit Basically, if the function stopping process of stopping at least part of the functions (operations), that is, part of the processes, of the demodulation unit is executed to stop the demodulation by the demodulation unit, the power consumption in the demodulation unit can be lower than where the demodulation unit is in normal operation.

Furthermore, the clock supply stopping process, the clock frequency reduction process, the power supply stopping process, the power supply voltage reduction process, or the like can be appropriately executed in addition to the function stopping process to further reduce the power consumption of the demodulation unit.

Note that in the state in which the broadcast signal is not demodulated due to the execution of the demodulation stopping process, or more specifically, in the state in which the process applied to the broadcast signal that is a digital signal is stopped, a process of estimating the state (characteristics) of the transmission path of the broadcast signal performed during the demodulation is not executed.

In this case, since the estimation result of the transmission path characteristics is not updated, the estimation result of the transmission path characteristics is not the latest at the resumption of the demodulation process after the end of the demodulation stopping process. Therefore, it takes time to figure out an accurate state of the transmission path when the state of the transmission path is changed during the demodulation stopping process. As a result, the demodulation performance just after the resumption of the demodulation process may decrease.

Furthermore, in a case where the clock supply stopping process, the clock frequency reduction process, the power supply stopping process, the power supply voltage reduction process, or the like is executed as the demodulation stopping process, the temperature of the chip provided with an oscillator that generates the clock is changed according to the change in the power consumption from during the demodulation process. Consequently, the oscillation frequency of the clock is changed due to the temperature characteristics of the oscillator (crystal), and as a result, the demodulation performance may be reduced by a clock error.

Therefore, in a case where the demodulation stopping process is to be executed in the present technique, a demodulation preliminary operation is performed in a section of some continuous OFDM symbols not storing the service to be taken out, just in front of the OFDM symbols or the subframe storing the service to be taken out from the broadcast signal.

In the present technique, the receiver corrects the clock error (corrects the phase error) and estimates the transmission path characteristics in the demodulation preliminary operation based on a pilot signal included in the OFDM symbols of the section. This can suppress the reduction in the demodulation performance caused by the delay in following the state of the transmission path and can suppress the reduction in the demodulation performance resulted from the clock error caused by the change in the temperature of the chip.

<Configuration Example of Receiver>

Figure 5:
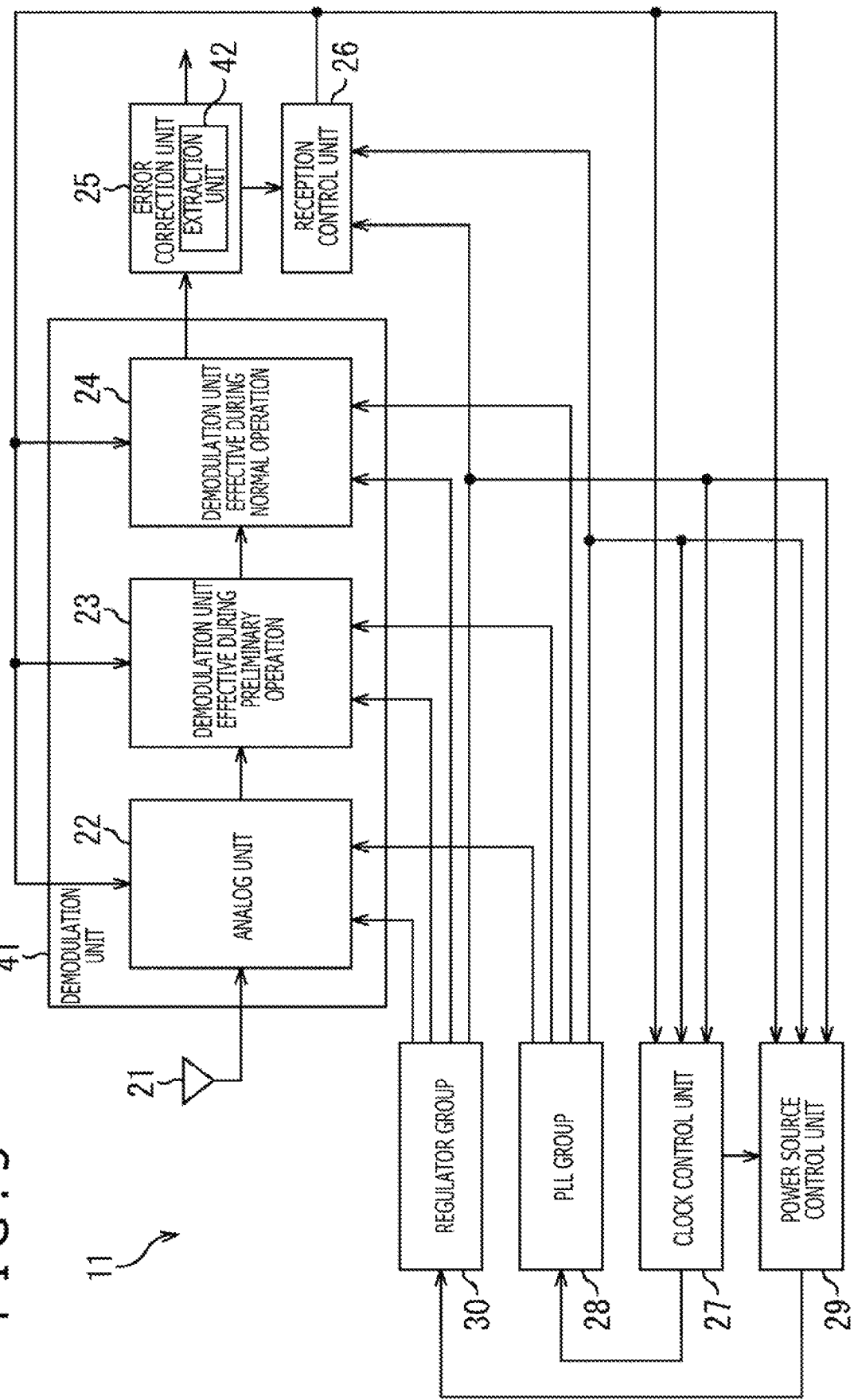
FIG. 5 is a diagram depicting a configuration example of a receiver.

Next, a configuration example of the receiver of the present technique will be described. FIG. 5 is a diagram depicting a configuration example of an embodiment of the receiver of the present technique.

A receiver 11 depicted in FIG. 5 includes an antenna 21, an analog unit 22, a demodulation unit 23 effective during preliminary operation, a demodulation unit 24 effective during normal operation, an error correction unit 25, a reception control unit 26, a clock control unit 27, a PLL (Phase Locked Loop) group 28, a power source control unit 29, and a regulator group 30.

The antenna 21 receives a broadcast signal wirelessly transmitted from a transmission apparatus or the like of a broadcast station and supplies the broadcast signal to the analog unit 22. The analog unit 22 executes a conversion process of converting the frequency of an RF (Radio Frequency) signal that is the broadcast signal supplied from the antenna 21 into the frequency of an IF (Intermediate Frequency) signal and an A/D (Analog/Digital) conversion process for the broadcast signal and supplies the signal to the demodulation unit 23 effective during preliminary operation.

The demodulation unit 23 effective during preliminary operation applies quadrature demodulation, phase error correction, FFT (Fast Fourier Transform), transmission path estimation in the time direction, and the like to the broadcast signal supplied from the analog unit 22 and supplies the processing results to the demodulation unit 24 effective during normal operation. Therefore, an OFDM signal in the frequency domain obtained by the FFT and an estimation result of the transmission path characteristics in the time direction are supplied from the demodulation unit 23 effective during preliminary operation to the demodulation unit 24 effective during normal operation.

The demodulation unit 24 effective during normal operation estimates and equalizes the transmission path characteristics in the frequency direction based on the OFDM signal in the frequency domain and the estimation result of the transmission path characteristics in the time direction supplied from the demodulation unit 23 effective during preliminary operation and supplies the OFDM signal in the frequency domain obtained as a result of the estimation and the equalization to the error correction unit 25.

Here, the analog unit 22, the demodulation unit 23 effective during preliminary operation, and the demodulation unit 24 effective during normal operation realize a demodulation unit 41 that executes a demodulation process of a broadcast signal. The analog unit 22 to the demodulation unit 24 effective during normal operation receive power from the regulator group 30 according to the control by the reception control unit 26 and perform respective operations in synchronization with clocks supplied from the PLL group 28.

The analog unit 22 is a block that processes the broadcast signal that is an analog signal, and the demodulation unit 23 effective during preliminary operation and the demodulation unit 24 effective during normal operation are blocks that process the broadcast signal converted into a digital signal.

Particularly, the demodulation unit 23 effective during preliminary operation is a block that stops operating due to the demodulation stopping process during the stop of demodulation and that operates during the demodulation preliminary operation. On the other hand, the demodulation unit 24 effective during normal operation is a block in a later stage of the demodulation unit 23 effective during preliminary operation and is configured to operate only during normal operation, that is, during normal demodulation operation, and configured to stop operating during the stop of demodulation and during the demodulation preliminary operation.

The error correction unit 25 corrects an error of the OFDM signal supplied from the demodulation unit 24 effective during normal operation and supplies the signal obtained as a result of the error correction to a block in a later stage.

In addition, the error correction unit 25 includes an extraction unit 42, and the extraction unit 42 extracts signaling information for obtaining information indicating the arrangement of all PLPs in the frames of the broadcast signal from the signal obtained by the error correction and supplies the signaling information to the reception control unit 26.

The reception control unit 26 controls each components of the receiver 11 based on the signaling information supplied from the error correction unit 25.

For example, the reception control unit 26 instructs each components of the demodulation unit 41 to perform the normal demodulation operation, execute the demodulation stopping process, or perform the demodulation preliminary operation. The reception control unit 26 also instructs the clock control unit 27 to execute the clock supply stopping process or the clock frequency reduction process and instructs the power source control unit 29 to execute the power supply stopping process or the power supply voltage reduction process.

The clock control unit 27 supplies clock control information for controlling the generation of the clocks to the PLL group 28 and the power source control unit 29 according to the instruction of the reception control unit 26 and controls the clock generation by the PLL group 28 based on the clock control information.

The PLL group 28 includes, for example, one or a plurality of oscillators or PLL circuits and is configured to generate clocks (clock signals) based on the clock control information supplied from the clock control unit 27 and supply the obtained clocks to each components of the receiver 11.

For example, the PLL group 28 supplies the clocks to the analog unit 22, the demodulation unit 23 effective during preliminary operation, the demodulation unit 24 effective during normal operation, the reception control unit 26, the clock control unit 27, and the power source control unit 29. Particularly, the same or different clocks are individually supplied to the analog unit 22, the demodulation unit 23 effective during preliminary operation, and the demodulation unit 24 effective during normal operation, and the same clock is simultaneously supplied to the reception control unit 26, the clock control unit 27, and the power source control unit 29 in the example.

Note that the configuration of the PLL group 28 may be any configuration as long as the clocks can be supplied to each components of the receiver 11.

For example, the PLL group 28 may use only the clock of one clock source (oscillator) to generate the clocks to be supplied to the components or may generate divided clocks from a plurality of clock sources. The PLL group 28 may also include a plurality of clock sources or may include a variable clock source, for example.

In accordance with the instruction of the reception control unit 26, the power source control unit 29 appropriately refers to the clock control information supplied from the clock control unit 27 to supply, to the regulator group 30, power source control information for controlling the supply of power source and controls the power source supplied by the regulator group 30 based on the power source control information.

The regulator group 30 includes one or a plurality of regulators and generates power sources (power) at predetermined voltages based on the power source control information supplied from the power source control unit 29 and supplies the power sources to each components of the receiver 11.

For example, the regulator group 30 supplies the power sources to the analog unit 22, the demodulation unit 23 effective during preliminary operation, the demodulation unit 24 effective during normal operation, the reception control unit 26, the clock control unit 27, and the power source control unit 29. Particularly, the power sources at the same or different voltages are individually supplied to the analog unit 22, the demodulation unit 23 effective during preliminary operation, and the demodulation unit 24 effective during normal operation, and the power sources at the same voltage are simultaneously supplied to the reception control unit 26, the clock control unit 27, and the power source control unit 29 in the example.

Note that in the power supply controlled by the power source control unit 29, the power source may be continuously supplied to each components of the receiver 11 without stopping the supply of power source, or a state in which the power source is supplied and a state in which the power supply is shut off may be appropriately switched. Furthermore, a plurality of fixed voltage power sources included in the regulator group 30 may be switched to realize the power supply voltage reduction process, or a variable voltage power source included in the regulator group 30 may realize the power supply voltage reduction process.

<Configuration Example of Analog Unit, Demodulation Unit Effective During Preliminary Operation, and Demodulation Unit Effective During Normal Operation>

Figure 6:
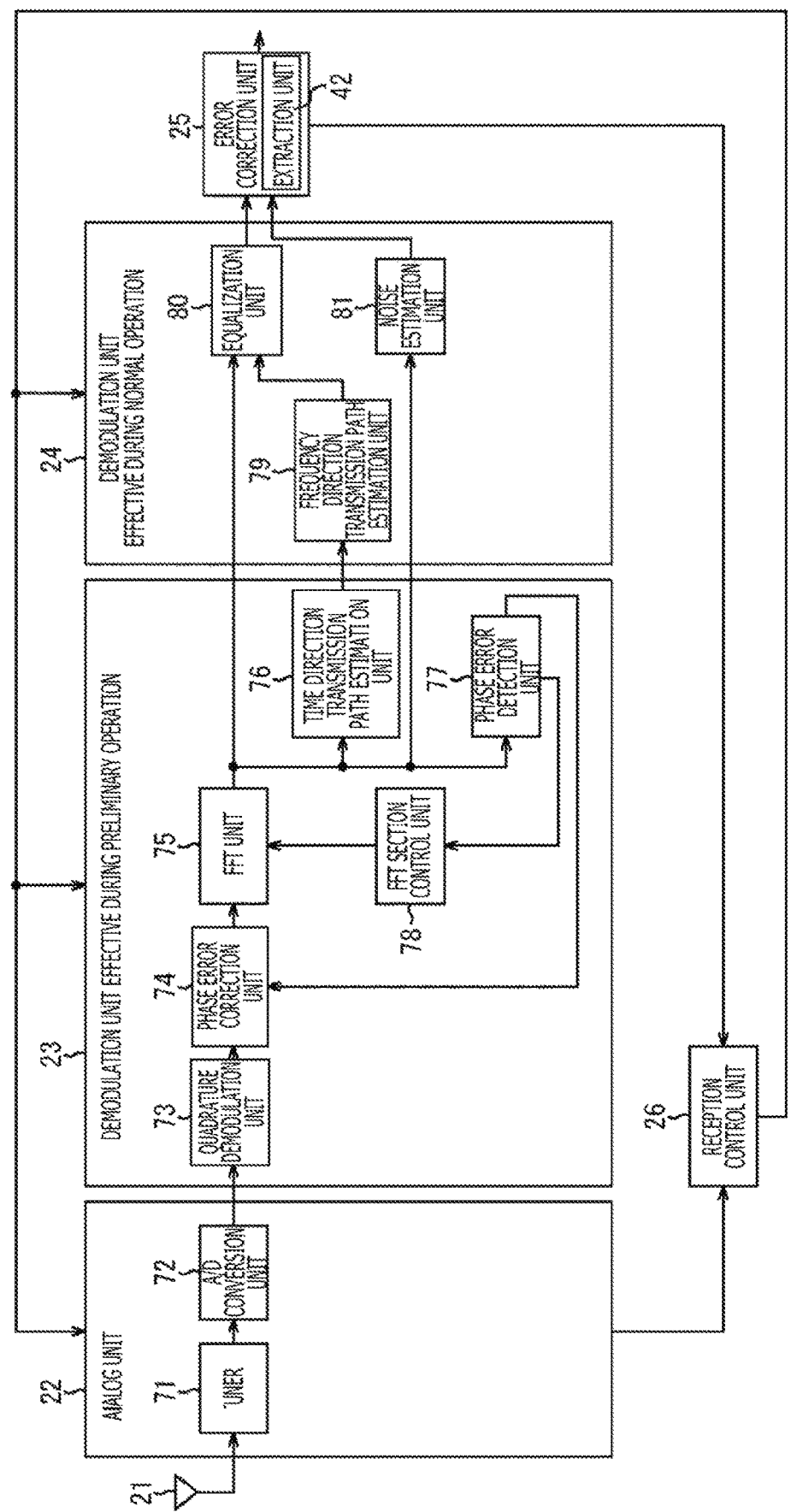
FIG. 6 is a diagram depicting a configuration example of an analog unit to a demodulation unit effective during normal operation.

Further, in more detail, the analog unit 22, the demodulation unit 23 effective during preliminary operation, and the demodulation unit 24 effective during normal operation depicted in FIG. 5 are configured as depicted for example in FIG. 6. Note that in FIG. 6, the same reference signs are provided to the parts corresponding to the case of FIG. 5, and the description will be appropriately omitted.

In the example of FIG. 6, the analog unit 22 includes a tuner 71 and an A/D conversion unit 72.

The demodulation unit 23 effective during preliminary operation also includes a quadrature demodulation unit 73, a phase error correction unit 74, an FFT unit 75, a time direction transmission path estimation unit 76, a phase error detection unit 77, and an FFT section control unit 78.

Furthermore, the demodulation unit 24 effective during normal operation includes a frequency direction transmission path estimation unit 79, an equalization unit 80, and a noise estimation unit 81.

The tuner 71 converts the frequency of an RF signal that is a broadcast signal supplied from the antenna 21 into the frequency of an IF signal and supplies the IF signal to the A/D conversion unit 72. The A/D conversion unit 72 applies A/D conversion to the IF signal supplied from the tuner 71 to convert the IF signal from an analog signal to a digital signal and supplies the IF signal to the quadrature demodulation unit 73.

The quadrature demodulation unit 73 uses a carrier wave to apply quadrature demodulation to the IF signal supplied from the A/D conversion unit 72 and supplies a baseband OFDM signal obtained as a result of the quadrature demodulation to the phase error correction unit 74. The baseband OFDM signal is a complex signal of the time domain including real axis components (I components) and imaginary axis components (Q components).

The phase error correction unit 74 corrects a phase error of the OFDM signal supplied from the quadrature demodulation unit 73 based on a detection result of the phase error supplied from the phase error detection unit 77, that is, carrier frequency error of the OFDM signal, and supplies the OFDM signal to the FFT unit 75. Here, the carrier frequency error is an error of the center frequency position of the OFDM signal generated by a deviation or the like of a reference frequency in the tuner 71 caused by an error or the like of the clock output from the PLL group 28.

The FFT unit 75 applies FFT computation to the OFDM signal supplied from the phase error correction unit 74 based on an FFT trigger pulse signal supplied from the FFT section control unit 78 and supplies the OFDM signal of the frequency domain obtained as a result of the FFT computation to the equalization unit 80, the time direction transmission path estimation unit 76, the noise estimation unit 81, and the phase error detection unit 77. The FFT trigger pulse signal is a signal indicating the start position of a section for performing the FFT computation in the OFDM signal, more specifically, a section as a target of the FFT computation.

The time direction transmission path estimation unit 76 extracts a pilot signal from the OFDM signal supplied from the FFT unit 75 and estimates the transmission path characteristics in the time direction based on the distortion (deviation) of the pilot signal in the time direction at each frequency (subcarrier) of the OFDM signal. The time direction transmission path estimation unit 76 supplies the estimation result of the transmission path characteristics in the time direction and the extraction result of the pilot signal to the frequency direction transmission path estimation unit 79.

The phase error detection unit 77 extracts the pilot signal from the OFDM signal supplied from the FFT unit 75 and detects the phase error (carrier frequency error) of the OFDM signal based on the extraction result. The phase error detection unit 77 supplies the detection result to the phase error correction unit 74 and the FFT section control unit 78. Here, the phase error is detected based on, for example, the degree of rotation of the pilot signal.

The FFT section control unit 78 generates an FFT trigger pulse signal based on the detection result of the phase error supplied from the phase error detection unit 77 and supplies the FFT trigger pulse signal to the FFT unit 75.

The frequency direction transmission path estimation unit 79 estimates the transmission path characteristics in the frequency direction based on the estimation result of the transmission path characteristics in the time direction and the extraction result of the pilot signal supplied from the time direction transmission path estimation unit 76 and supplies transmission path characteristic data indicating the estimation results of the transmission path characteristics in the time direction and the frequency direction to the equalization unit 80. Here, the transmission path characteristics in the frequency direction are estimated based on, for example, the distortion (deviation) of the pilot signal in the frequency direction at each frequency (subcarrier) of the OFDM signal.

The equalization unit 80 removes (corrects) components of the distortion of the amplitude and the phase caused by the transmission path from the OFDM signal supplied from the FFT unit 75 based on the transmission path characteristic data supplied from the frequency direction transmission path estimation unit 79 and supplies the OFDM signal after the removal of the distortion components to the error correction unit 25. For example, the OFDM signal is divided by the transmission path characteristic data to remove the distortion components, that is, execute an equalization process.

Based on the OFDM signal supplied from the FFT unit 75, the noise estimation unit 81 compares the pilot signal included in the OFDM signal with a proper pilot signal to estimate noise included in the OFDM signal and supplies the estimation result to the error correction unit 25. For example, a ratio of signal components to noise components (SN ratio (signal to noise ratio)) or the like is obtained as the result of the noise estimation.

The error correction unit 25 applies an error correction process, such as de-interleaving, de-puncturing, Viterbi decoding, LDPC (Low Density Parity Check) decoding, and Reed-Solomon decoding, to the OFDM signal supplied from the equalization unit 80 based on the result of the noise estimation supplied from the noise estimation unit 81 and outputs the OFDM signal to a block in a later stage.

<Stop of Demodulation and Demodulation Preliminary Operation in Receiver>

The receiver 11 configured as described above receives and processes a broadcast signal compliant with, for example, the ATSC 3.0 standard in the configuration depicted in FIG. 1.

As described above, all of the OFDM symbols in the received frames of the broadcast signal, that is, the entire frames of the broadcast signal, are generally demodulated. However, there are OFDM symbols that do not always have to be demodulated depending on the received contents or the configuration of the PLPs in the frames.

Therefore, the receiver 11 is configured to decide the PLPs to be received (hereinafter, also referred to as reception PLPs) among the PLPs included in the frames based on content information sent by all PLPs in the frames of the broadcast signal and to control the demodulation of the frames according to the decision result. The reception PLPs are PLPs storing necessary services to be taken out.

For example, the content information is information indicating PLPs storing the data of services, such as video and sound data and metadata constituting the contents, that is, a mapping relationship between the services and the PLPs, and the content information is stored in the PLPs. A flag indicating whether the content information is stored in the PLPs is included in the preamble signal.

The reception control unit 26 acquires the content information extracted from the OFDM signal from, for example, the error correction unit 25 or a block that performs decoding in a later stage of the error correction unit 25 and decides the reception PLPs for each frame of the broadcast signal to be received based on the acquired content information. As for the method of deciding the reception PLPs, the reception control unit 26 may decide the reception PLPs based on other information or the like instead of the content information.

Furthermore, when the receiver 11 demodulates the bootstrap signal and the preamble signal of a frame of the broadcast signal, the receiver 11 can specify the arrangement of the PLPs stored in the frame.

Figure 7:
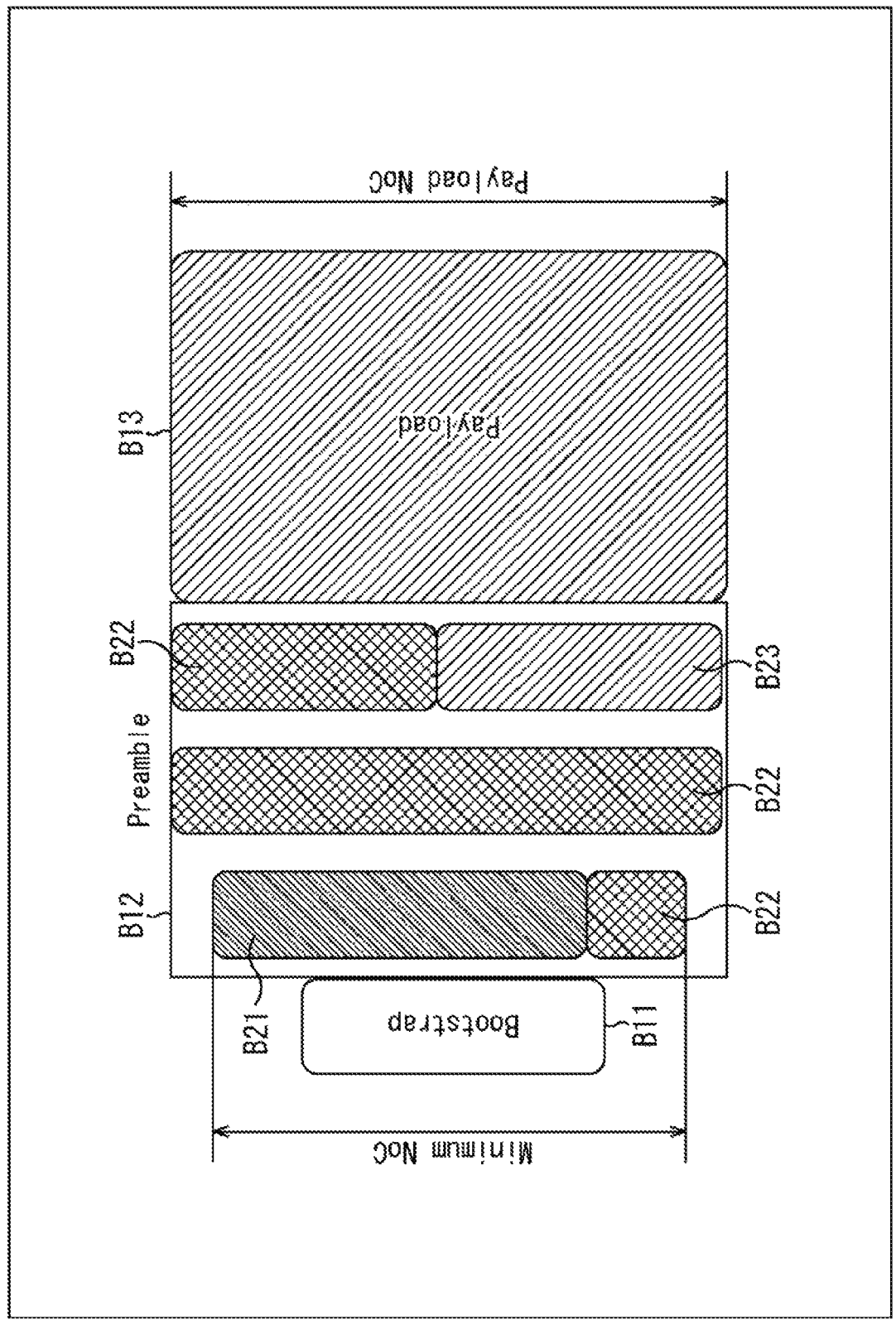
FIG. 7 is a diagram describing extraction of signaling information.

For example, as depicted in FIG. 7, one frame of the broadcast signal includes a bootstrap signal B11, a preamble signal B12, and one or a plurality of subframes B13 following the signals. In addition, the preamble signal B12 includes an L1-Basic signal B21, an L1-Detail signal B22, and a payload B23.

The L1-Basic signal B21 is demodulated to obtain L1-Basic signaling information, and the L1-Detail signal B22 is demodulated to obtain L1-Detail signaling information. In addition, the payload B23 stores the data and the like of the services. Therefore, part of the first subframe and the payload B23 constitute the PLPs. Note that in the description continued below, the PLPs are constituted by only the data cells in the subframes to simplify the description.

The L1-Basic signaling information includes information for deciphering the L1-Detail signaling information, such as information indicating the length and the type of the L1-Detail signaling information, and it is made possible to correctly extract the information included in the L1-Detail signaling information by the L1-Basic signaling information. The L1-Detail signaling information also includes information indicating the PLPs and the arrangement of the PLPs in each subframe constituting the frame.

Arrangement information indicating the arrangement positions of all PLPs in the frame of the broadcast signal and time interleaving information indicating the interleaving arrangement of the data cells in the time direction can be generated from the L1-Basic signaling information and the L1-Detail signaling information. The L1-Basic signaling information and the L1-Detail signaling information as well as the arrangement information and the time interleaving information generated from the information are described in, for example, "Advanced Television Systems Committee, "ATSC Candidate Standard: Physical Layer Protocol," Doc. 532-230r21, 28 Sep. 2015" that is a specification (candidate standard) of ATSC 3.0.

Note that, hereinafter, the information will also be simply referred to as signaling information where the L1-Basic signaling information and the L1-Detail signaling information do not have to be particularly distinguished.

The reception control unit 26 generates the arrangement information and the time interleaving information based on the signaling information supplied from the extraction unit 42 and specifies the OFDM symbols and the subframes including the reception PLPs in the frame based on the arrangement information, the time interleaving information, and the decision result of the reception PLPs. The reception control unit 26 then stops the demodulation in the sections of the OFDM symbols or the subframes not including the reception PLPs according to the specification result and reduces the power consumption of the receiver 11.

In stopping the demodulation, the reception control unit 26 executes at least one of the processes PR1 to PR5 as described above.

For example, the reception control unit 26 controls the operation of the analog unit 22 to the demodulation unit 24 effective during normal operation to execute the function stopping process to stop the supply of the IF signal from the A/D conversion unit 72 to the quadrature demodulation unit 73 and to stop the supply of the FFT trigger pulse signal from the FFT section control unit 78 to the FFT unit 75.

Furthermore, for example, the reception control unit 26 controls the clock control unit 27 to shut off the clocks supplied from the PLL group 28 to the demodulation unit 23 effective during preliminary operation and the demodulation unit 24 effective during normal operation or to reduce the frequency of the supplied clocks. Therefore, the execution of the clock supply stopping process or the clock frequency reduction process is controlled in the demodulation stopping process.

In a case where the function stopping process, the clock supply stopping process, or the clock frequency reduction process is executed, the reception control unit 26 further controls the power source control unit 29 to shut off the power source supplied from the regulator group 30 to the demodulation unit 23 effective during preliminary operation and the demodulation unit 24 effective during normal operation or to reduce the voltage of the supplied power source, for example. Therefore, the execution of the power supply stopping process or the power supply voltage reduction process is controlled in the demodulation stopping process.

The demodulation stopping process can control the demodulation process on the basis of more detailed time control to reduce the power consumption of the receiver 11 in the demodulation.

Further, when the demodulation stopping process is executed as described above, the temperature of the PLL group 28 or the regulator group 30 may be changed, or the time direction transmission path estimation unit 76 may not follow the estimation of the transmission path characteristics in time. This may deteriorate the demodulation performance just after the return from the stop of demodulation.

Therefore, the reception control unit 26 executes the demodulation preliminary operation in a section including a plurality of continuous OFDM symbols just in front of the section including the OFDM symbols or the subframe including the reception PLPs. As a result, a demodulation process not much affected by the variation in the transmission path characteristics during the stop of demodulation, the clock error caused by the change in the temperature, or the like can be realized just after the removal of the stop of demodulation.

In the demodulation preliminary operation, each components of the demodulation unit 23 effective during preliminary operation executes the processes. More specifically, for example, the time direction transmission path estimation unit 76 estimates the transmission path characteristics in the time direction, that is, updates the transmission path characteristics. The phase error detection unit 77 detects the phase error, and the phase error correction unit 74 corrects the phase error.

Although the estimation of the transmission path characteristics in the time direction, the detection of the phase error, the correction of the phase error, and the like among the processes of demodulating the broadcast signal are performed in the demodulation preliminary operation in the example described here, it is only necessary to execute at least one of the processes. More specifically, it is only necessary to execute a process that can at least reduce the deterioration of the demodulation performance.

In addition, since the receiver 11 executes the demodulation stopping process and the demodulation preliminary operation, the demodulation unit is divided into blocks (domain) necessary for the operations.

More specifically, as described with reference to FIG. 5, the clock supply domain and the power supply domain are divided into the analog unit 22, the demodulation unit 23 effective during preliminary operation, the demodulation unit 24 effective during normal operation, and the reception control unit 26.

As a result, for example, the control of shutting off the supply of clock and the supply of power source for the demodulation unit 23 effective during preliminary operation and the demodulation unit 24 effective during normal operation and reducing the frequency of the supplied clock and the voltage of the supplied power source for the reception control unit 26 can be performed in stopping the demodulation.

Furthermore, for example, the control of shutting off the supply of clock and the supply of power source for the demodulation unit 24 effective during normal operation and supplying the clock and the power source to the demodulation unit 23 effective during preliminary operation and the reception control unit 26 as usual can be performed in the demodulation preliminary operation.

In this way, the domain can be divided to control the supply of clock and the supply of power source in more detail to thereby reduce the power consumption of the receiver 11.

Specific Example 1 of Stop of Demodulation and Demodulation Preliminary Operation in Receiver Hereinafter, it is assumed that there are three demodulation modes indicating the operation state in the demodulation by the receiver 11: a normal demodulation mode of performing the demodulation as usual; a demodulation stop mode of stopping the demodulation; and a demodulation preliminary mode of performing the demodulation preliminary operation.

For example, in the normal demodulation mode, the analog unit 22, the demodulation unit 23 effective during preliminary operation, and the demodulation unit 24 effective during normal operation perform the demodulation as usual.

Figure 8:
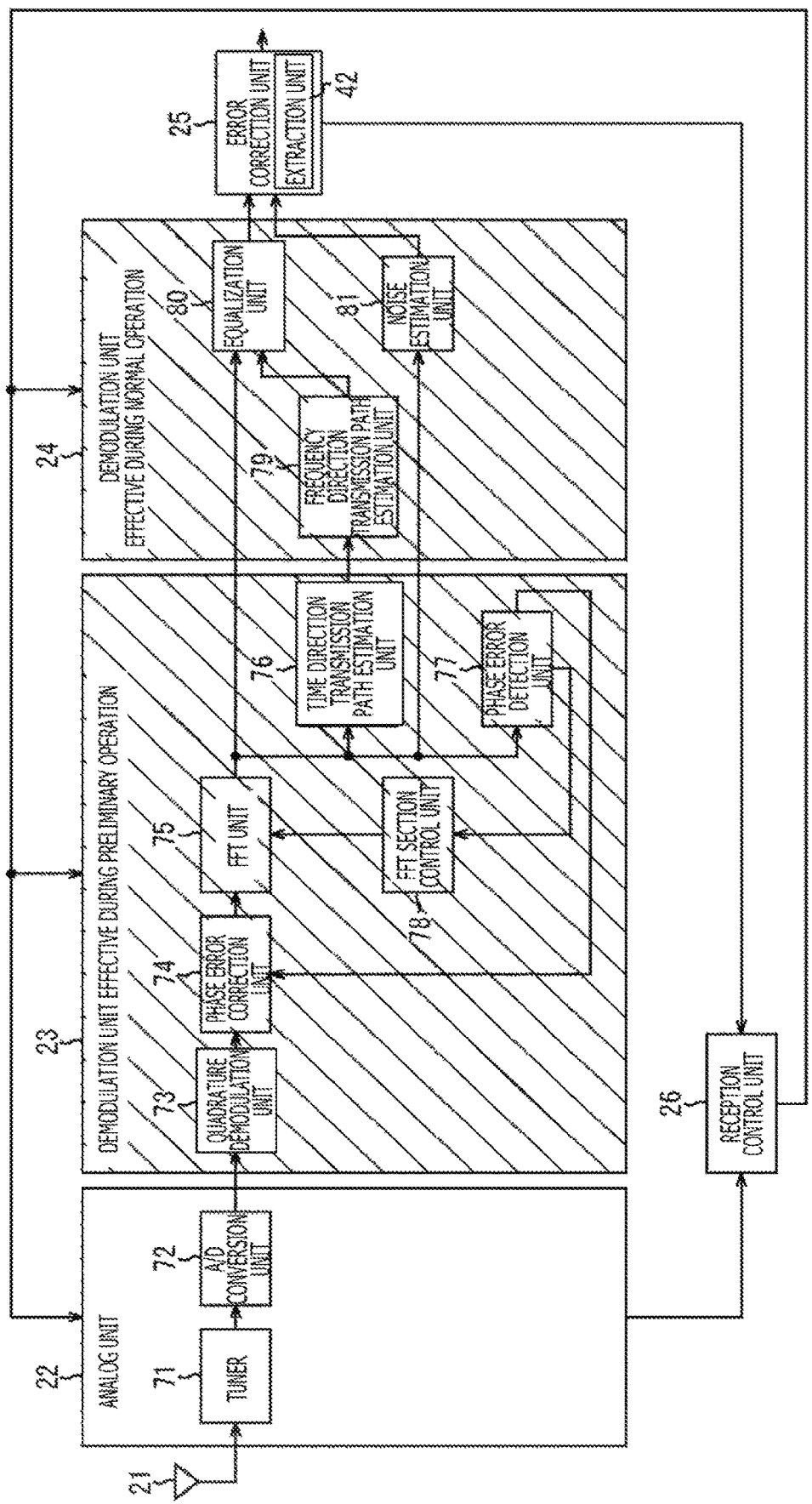
FIG. 8 is a diagram describing a demodulation stop mode.

Further, in the demodulation stop mode, as depicted for example in FIG. 8, the analog unit 22 performs the demodulation operation as usual, and the demodulation unit 23 effective during preliminary operation and the demodulation unit 24 effective during normal operation stop the operation (demodulation operation) through the demodulation stopping process. Note that in FIG. 8, the same reference signs are provided to the parts corresponding to the case of FIG. 6, and the description will be appropriately omitted.

In FIG. 8, the blocks provided with diagonal lines indicate blocks that stop operating, and in the example, the demodulation unit 23 effective during preliminary operation and the demodulation unit 24 effective during normal operation are the blocks that stop operating.

Figure 9:
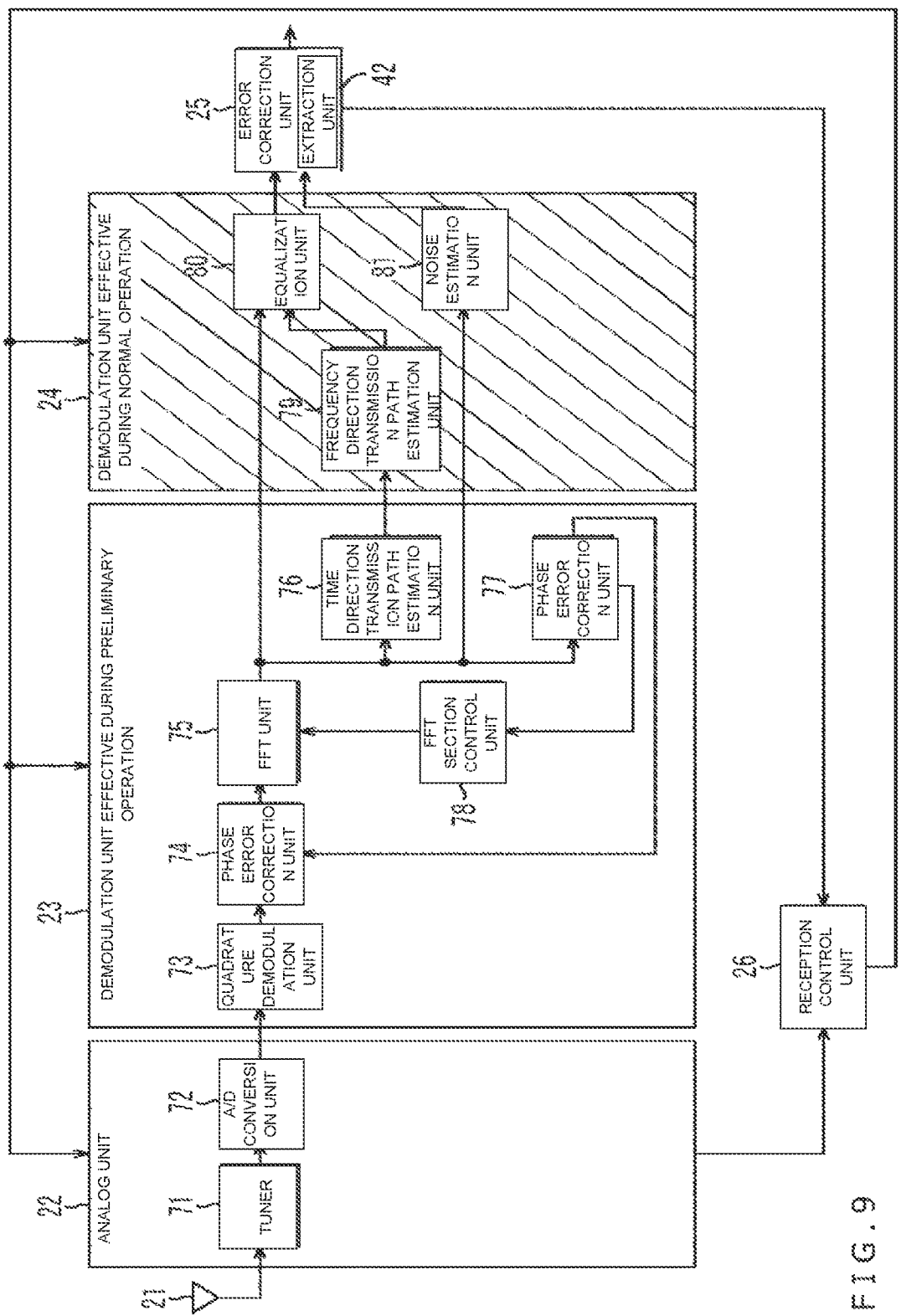
FIG. 9 is a diagram describing a demodulation preliminary mode.

Further, in the demodulation preliminary mode, as depicted for example in FIG. 9, the analog unit 22 and the demodulation unit 23 effective during preliminary operation perform the demodulation operation as usual, and the demodulation unit 24 effective during normal operation stops the operation (demodulation operation). Note that in FIG. 9, the same reference signs are provided to the parts corresponding to the case of FIG. 6, and the description will be appropriately omitted.

In FIG. 9, the block provided with diagonal lines indicates a block that stops operating, and in the example, the demodulation unit 24 effective during normal operation is the block that stops operating.

Figure 10:
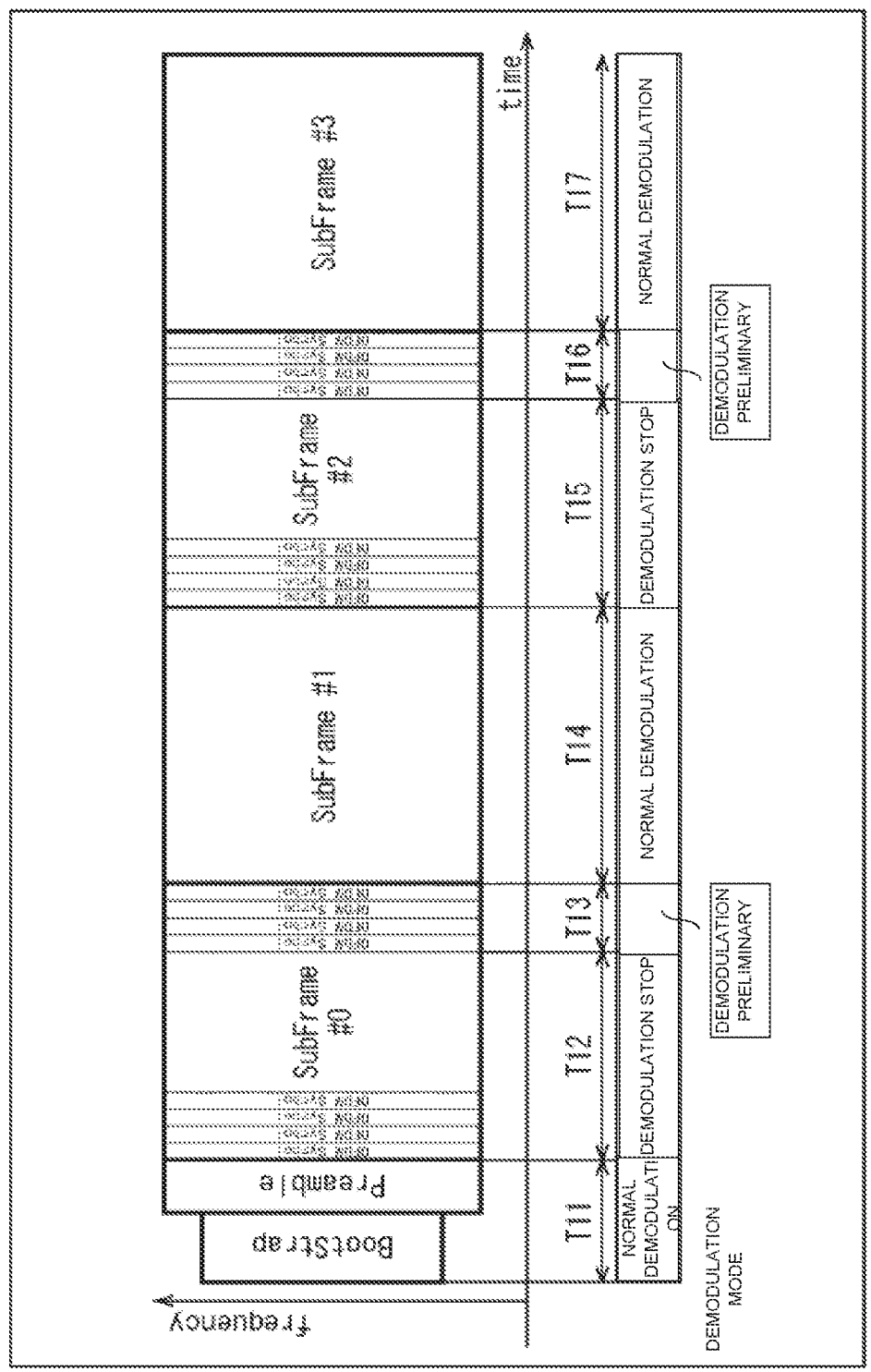
FIG. 10 is a diagram describing an example of selecting a demodulation mode.

It is assumed that the receiver 11 receives a frame of a broadcast signal as depicted for example in FIG. 10 in the demodulation of the broadcast signal received while the normal demodulation mode, the demodulation stop mode, and the demodulation preliminary mode are appropriately switched. Note that in FIG. 10, the same characters are provided to the parts corresponding to the case of FIG. 2, and the description will be appropriately omitted.

In the example depicted in FIG. 10, one frame includes four subframes #0 to #3.

It is assumed here that the demodulation operation is controlled on the basis of subframes, and the subframe #1 and the subframe #3 include the reception PLPs. Therefore, it is assumed that the subframe #0 and the subframe #2 do not include the reception PLPs. It is also assumed that the length of the section for performing the demodulation preliminary operation is a section with a length equivalent to four OFDM symbols.

In this case, the reception control unit 26 executes the demodulation process in the normal demodulation mode in a section T11 at the top of the frame including the bootstrap signal and the preamble signal.

The reception control unit 26 sets the demodulation stop mode in a section T12 following the section T11 and including the majority of the OFDM symbols of the subframe #0 without reception PLPs. The reception control unit 26 also sets the demodulation preliminary mode in a section T13 in the subframe #0 following the section T12 and including four OFDM symbols just in front of the subframe #1 with reception PLPs.

The reception control unit 26 further sets the normal demodulation mode in a section T14 following the section T13 and including the subframe #1 with reception PLPs.

Thereafter, similarly, the reception control unit 26 sets the demodulation stop mode in a section T15 including the majority of OFDM symbols of the subframe #2 without reception PLPs, sets the demodulation preliminary mode in a subsequent section T16 including four OFDM symbols, and sets the normal demodulation mode in a section T17 including the subframe #3 with reception PLPs.

Figure 11:
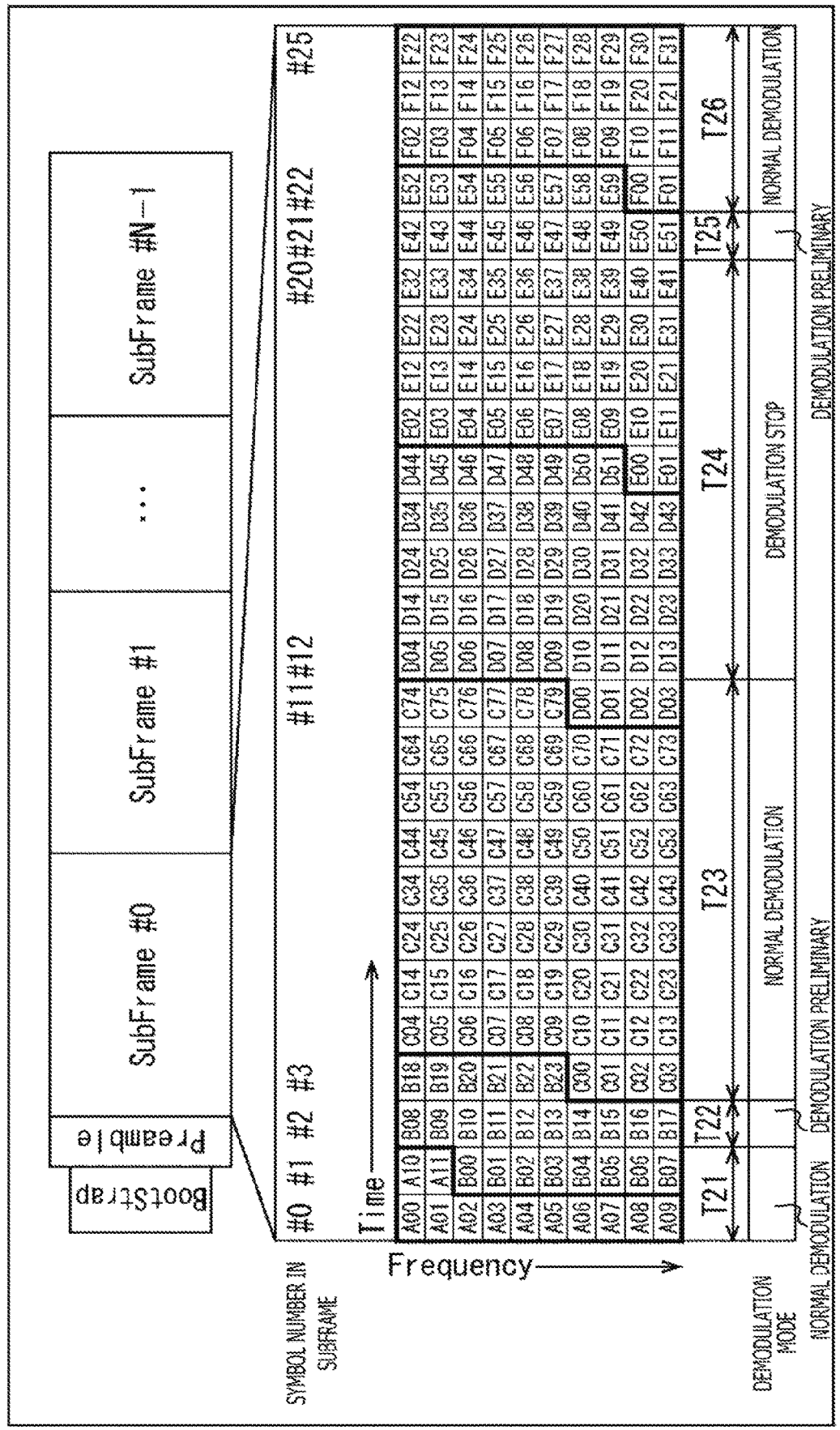
FIG. 11 is a diagram describing an example of selecting the demodulation mode.

Specific Example 2 of Stop of Demodulation and Demodulation Preliminary Operation in Receiver Further, in a case where the demodulation is controlled on the basis of OFDM symbols, and a frame of a broadcast signal depicted in FIG. 11 is received, for example, the reception control unit 26 switches the demodulation mode as follows to control the demodulation. Note that in FIG. 11, the same characters are provided to the parts corresponding to the case of FIG. 2, and the description will be appropriately omitted.

Further, in FIG. 11, the OFDM symbols constituting the subframe #0 and the data cells constituting each OFDM symbol are expressed by rectangles. More specifically, each of the rectangles provided with characters "A00" to "F31" represents one data cell, and a column of data cells lined up in the vertical direction in FIG. 11 constitutes one OFDM symbol.

For example, a column of data cells including data cells provided with respective characters "A00" to "A09" constitutes one OFDM symbol. In addition, in FIG. 11, symbol numbers for distinguishing the OFDM symbols in the subframe are written above some OFDM symbols, and a symbol number #0 is provided to the OFDM symbol on the left end of FIG. 11. Hereinafter, a symbol number will be provided to the OFDM symbol to indicate a specific OFDM symbol, such as OFDM symbol #0 for the OFDM symbol with symbol number #0.

In addition, in FIG. 11, alphabets in the data cells indicate PLPids for specifying the PLPs, and the numbers following the alphabets in the data cells indicate numbers of the data cells in the PLP. For example, the data cell provided with the character "A00" is a first data cell in the PLP in which the PLPid is A.

Therefore, it can be understood in the example that the PLP in which the PLPid is A includes all data cells constituting the OFDM symbol #0 and two data cells provided with respective characters "A10" and "A11" constituting the OFDM symbol #1.

It can also be understood that the subframe #0 includes a total of six PLPs in which the respective PLPids are A to F, and the PLPs are multiplexed by time division in the subframe #0.

Hereinafter, each data cell will be written by using the character written in the data cell, such as data cell A00, as necessary, and the PLP will also be written by using the PLPid, such as PLP A, as necessary.

Based on the PLP configuration of the subframe #0, it is assumed that PLP A, PLP C, and PLP F are reception PLPs, and the length of the section for performing the demodulation preliminary operation is a section with a length equivalent to one OFDM symbol.

In such a case, the reception control unit 26 sets the normal demodulation mode in a section T21 constituted by the OFDM symbol #0 and the OFDM symbol #1 including the PLP A that is a reception PLP and sets the demodulation preliminary mode in a section T22 following the section T21 and including the OFDM symbol #2.

The demodulation stop mode is usually set in the section following the section of the normal demodulation mode. However, between the section T21 set to the normal demodulation mode and the section T23 that needs to be set to the normal demodulation mode next, there is only a section equivalent to one OFDM symbol in the example that needs to be reserved as a section for performing the demodulation preliminary operation. Therefore, if the demodulation stop mode is set in the section, the section for performing the demodulation preliminary operation cannot be reserved. Thus, the demodulation preliminary mode is set here in the section T22 following the section T21.

Also, the reception control unit 26 sets the normal demodulation mode in a section T23 constituted by the OFDM symbols #3 to #11 including the PLP C that is a reception PLP and sets the demodulation stop mode in a section T24 following the section T23 and including the OFDM symbols #12 to #20. The reception control unit 26 further sets the demodulation preliminary mode in a section T25 including the OFDM symbol #21 after the stop of demodulation and sets the normal demodulation mode in a subsequent section T26 including the PLP F that is a reception PLP.

In this way, the demodulation is controlled on the basis of a smaller time unit, that is, OFDM symbols in the subframe, and the power consumption of the receiver 11 can be reduced.

Figure 12:
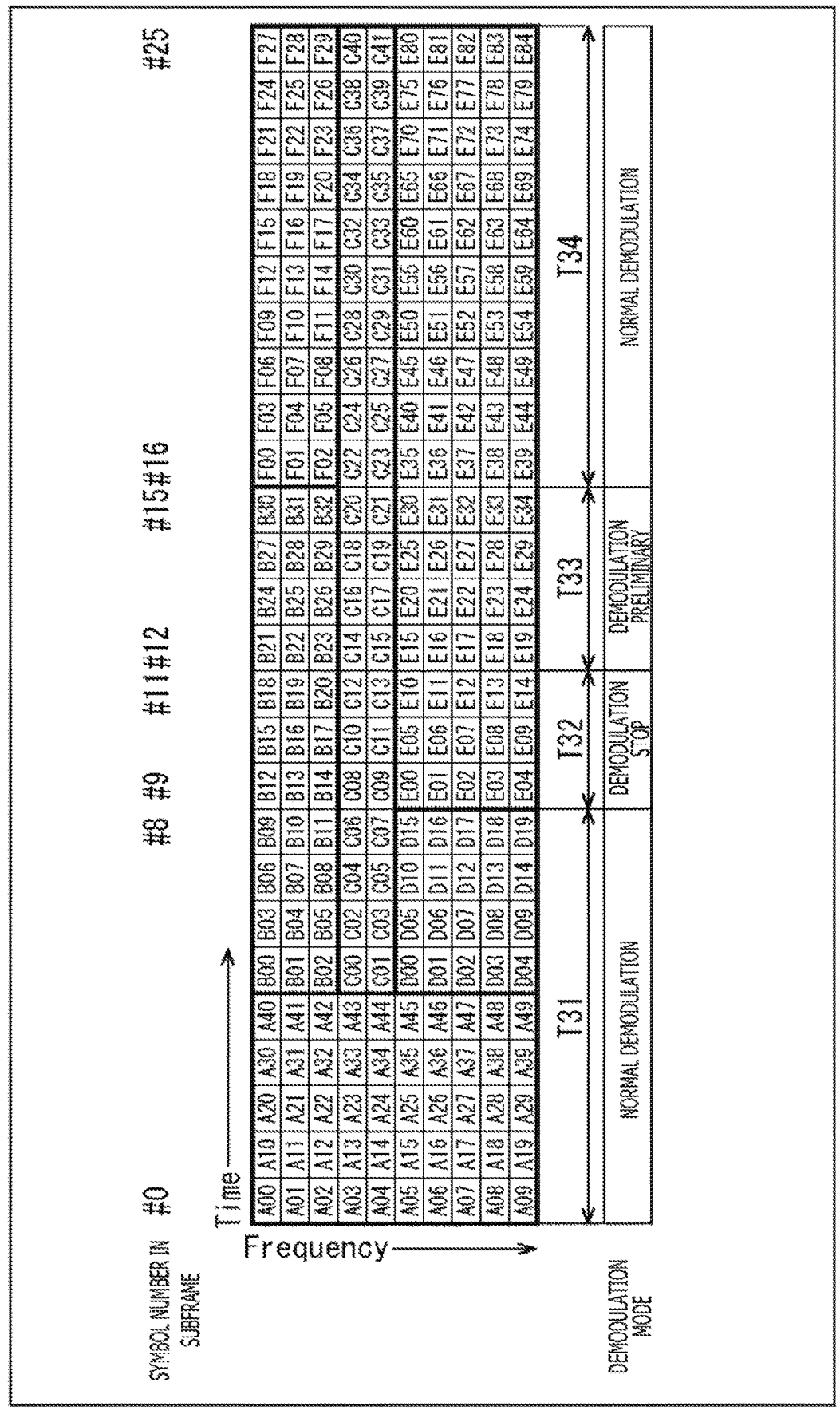
FIG. 12 is a diagram describing an example of selecting the demodulation mode.

Specific Example 3 of Stop of Demodulation and Demodulation Preliminary Operation in Receiver Further, in a case where the demodulation is controlled on the basis of OFDM systems, and a subframe of a broadcast signal depicted in FIG. 12 is received, for example, the reception control unit 26 switches the demodulation mode as follows to control the demodulation. Note that in FIG. 12, the same characters are provided to the parts corresponding to the case of FIG. 11, and the description will be appropriately omitted.

In the example, the subframe includes a total of six PLPs in which the respective PLPids are A to F, and the PLPs are multiplexed by a combination of time division and frequency division in the subframe.

On the basis of the PLP configuration of the subframe, it is assumed that the PLP A, the PLP D, and the PLP F are reception PLPs, and the length of the section for performing the demodulation preliminary operation is a section with a length equivalent to four OFDM symbols.

In such a case, the reception control unit 26 sets the normal demodulation mode in a section T31 constituted by the OFDM symbols #0 to #8 including the PLP A and the PLP D that are reception PLPs. The reception control unit 26 also sets the demodulation stop mode in a section T32 following the section T31 and including the OFDM symbols #9 to #11, in which the reception PLP is not included, and the demodulation preliminary operation is also not necessary.

The reception control unit 26 further sets the demodulation preliminary mode in a section T33 including four OFDM symbols just in front of the OFDM symbol #16 including the PLP F that is a reception PLP and sets the normal demodulation mode in a subsequent section T34 including the PLP F that is a reception PLP.

In this way, even when the time division and the frequency division are combined to arrange the PLPs in the subframe, the demodulation can be controlled by a smaller time unit to reduce the power consumption of the receiver 11.

<Description of Demodulation Process>

Next, a specific operation of the receiver 11 will be described.

When a broadcast signal is transmitted, the receiver 11 executes a demodulation process of receiving and decoding the broadcast signal. Hereinafter, the demodulation process by the receiver 11 will be described with reference to a flow chart of FIG. 13.

Note that the demodulation process is started when an RF signal that is a broadcast signal is received by the antenna 21 and supplied to the tuner 71. In addition, the demodulation process is executed for each frame.

In step S11, the tuner 71 converts the frequency of the RF signal supplied from the antenna 21 into the frequency of an IF signal and supplies the IF signal to the A/D conversion unit 72.

In step S12, the A/D conversion unit 72 applies A/D conversion to the IF signal supplied from the tuner 71 and supplies the IF signal to the quadrature demodulation unit 73. The IF signal after the A/D conversion is also supplied from the A/D conversion unit 72 to the reception control unit 26, for example. The reception control unit 26 can count the number of samples of the IF signal supplied from the A/D conversion unit 72 to figure out which part of the frame of the broadcast signal is received.

In step S13, the quadrature demodulation unit 73 applies quadrature demodulation to the IF signal supplied from the A/D conversion unit 72 and supplies a baseband OFDM signal obtained as a result of the quadrature demodulation to the phase error correction unit 74. In step S14, the phase error correction unit 74 then corrects a phase error of the OFDM signal supplied from the quadrature demodulation unit 73 on the basis of a detection result of the phase error supplied from the phase error detection unit 77 and supplies the OFDM signal to the FFT unit 75.

In step S15, the FFT unit 75 applies FFT computation to the OFDM signal supplied from the phase error correction unit 74 based on an FFT trigger pulse signal supplied from the FFT section control unit 78 and supplies the OFDM signal of the frequency domain obtained as a result of the FFT computation to the equalization unit 80, the time direction transmission path estimation unit 76, the noise estimation unit 81, and the phase error detection unit 77.

In step S16, the phase error detection unit 77 detects a phase error of the OFDM signal based on the OFDM signal supplied from the FFT unit 75 and supplies the detection result to the phase error correction unit 74 and the FFT section control unit 78.

In step S17, the FFT section control unit 78 generates an FFT trigger pulse signal based on the detection result of the phase error supplied from the phase error detection unit 77 and supplies the FFT trigger pulse signal to the FFT unit 75.

In step S18, the time direction transmission path estimation unit 76 estimates the transmission path characteristics in the time direction based on the OFDM signal supplied from the FFT unit 75 and supplies the estimation result and an extraction result of a pilot signal from the OFDM signal to the frequency direction transmission path estimation unit 79.

In step S19, the frequency direction transmission path estimation unit 79 estimates the transmission path characteristics in the frequency direction based on the estimation result of the transmission path characteristics in the time direction and the extraction result of the pilot signal supplied from the time direction transmission path estimation unit 76 and supplies transmission path characteristic data obtained as a result of the estimation to the equalization unit 80.

In step S20, the equalization unit 80 removes distortion components of the amplitude and the phase caused by the transmission path from the OFDM signal supplied from the FFT unit 75 based on the transmission path characteristic data supplied from the frequency direction transmission path estimation unit 79 and supplies the OFDM signal to the error correction unit 25.

In step S21, the noise estimation unit 81 performs noise estimation based on the OFDM signal supplied from the FFT unit 75 and supplies the estimation result to the error correction unit 25.

In step S22, the error correction unit 25 applies an error correction process to the OFDM signal supplied from the equalization unit 80 based on the result of the noise estimation supplied from the noise estimation unit 81.

In step S23, the extraction unit 42 extracts signaling information from the OFDM signal after the error correction process and supplies the signaling information to the reception control unit 26.

For example, the extraction unit 42 deciphers the bootstrap signal at the top of the OFDM signal to extract the L1-Basic signaling information from the preamble signal and further extracts the L1-Detail signaling information from the preamble signal based on the L1-Basic signaling information. The extraction unit 42 then supplies the signaling information to the reception control unit 26.

In addition, the error correction unit 25 outputs the OFDM signal after the error correction process to a block in a later stage, and the demodulation process ends.

<Description of Demodulation Control Process>

Figure 13:
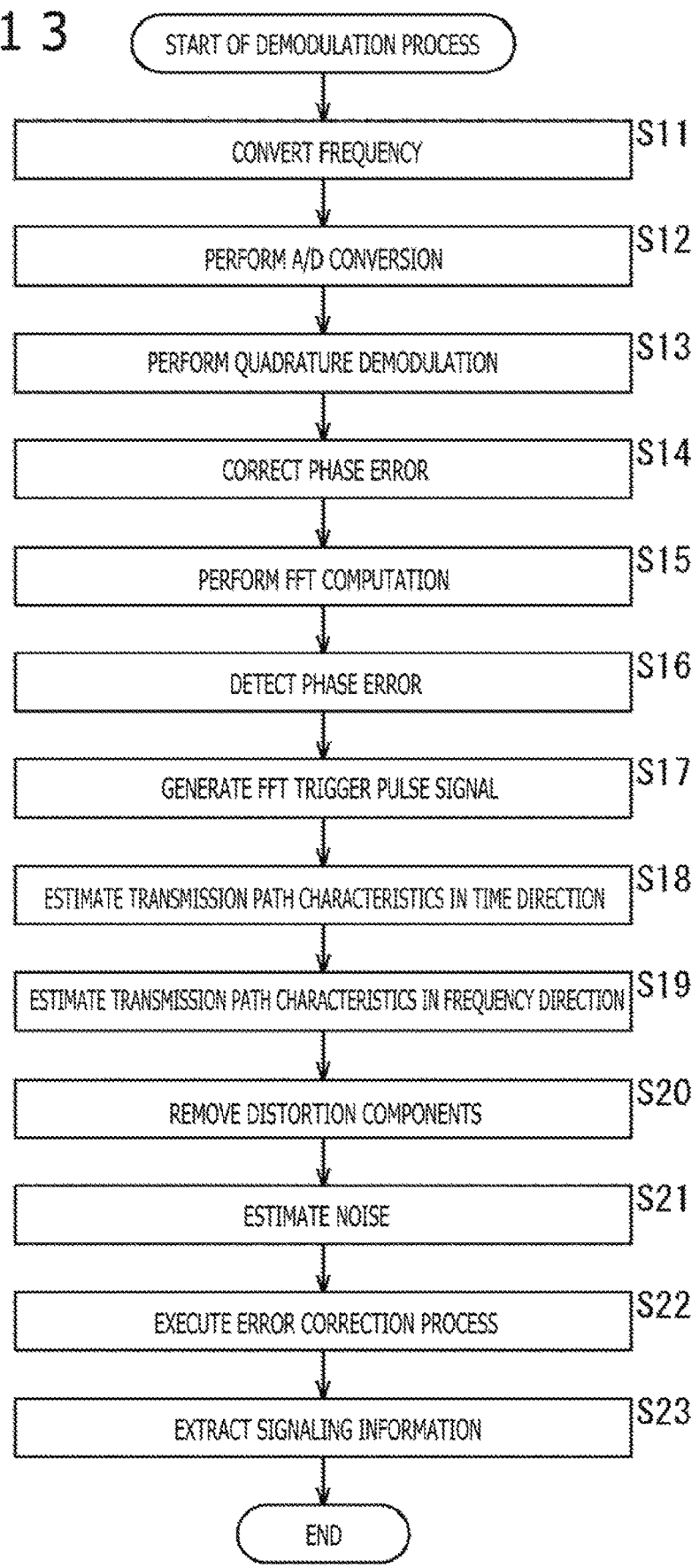
FIG. 13 is a flow chart describing a demodulation process.

In this way, the receiver 11 demodulates the received broadcast signal. Note that the demodulation process described with reference to FIG. 13 is a process in the normal demodulation mode. When the reception control unit 26 switches the demodulation mode, each components of the receiver 11 executes a process according to the demodulation mode after the switch.

Hereinafter, a demodulation control process by the receiver 11 appropriately switching the demodulation mode to control the demodulation will be described with reference to a flow chart of FIG. 14. Note that the demodulation control process is started when the demodulation process described with reference to FIG. 13 is started. The demodulation control process is also executed for each frame of the broadcast signal.

In step S51, the reception control unit 26 acquires signaling information from the extraction unit 42. In the process of step S51, the signaling information extracted in step S23 of FIG. 13 is acquired from the extraction unit 42.

In step S52, the reception control unit 26 specifies the arrangement positions of the reception PLPs in the entire frame to be processed based on content information acquired in advance from the error correction unit 25 or a block that performs decoding in a later stage of the error correction unit 25 and based on the signaling information.

Therefore, the reception control unit 26 decides the reception PLPs based on, for example, the content information. The reception control unit 26 also generates arrangement information indicating the arrangement positions of all PLPs in the frame of the broadcast signal and time interleaving information based on the signaling information and specifies the arrangement positions of the reception PLPs from the arrangement information and the time interleaving information.

In step S53, the reception control unit 26 decides the demodulation mode in each section of the frame of the broadcast signal based on the specification result of the arrangement positions of the reception PLPs. For example, as described with reference to FIGS. 10, 11, and 12, the demodulation mode to be set is decided for each section on the basis of subframes or OFDM symbols in the frame.

In step S54, the reception control unit 26 determines whether or not to set the normal modulation mode.

For example, the reception control unit 26 receives the supply of the IF signal obtained in step S12 of FIG. 13 and counts the number of samples of the IF signal to specify which part of the frame, that is, subframe number and OFDM symbol number, is received. Based on the specification result and the decision result of the demodulation mode obtained in step S53, the reception control unit 26 then determines to set the normal demodulation mode at the timing of the reception of the signal of the section set to the normal demodulation mode.

If the reception control unit 26 determines to set the normal demodulation mode in step S54, the reception control unit 26 controls the analog unit 22 to the demodulation unit 24 effective during normal operation to execute the demodulation process in step S55, and then the process proceeds to step S59.

As a result, the demodulation process described with reference to FIG. 13 is continued. In this case, the reception control unit 26 also controls the clock control unit 27 and the power source control unit 29 to supply the clock and the power as usual.

On the other hand, if the reception control unit 26 determines not to set the normal demodulation mode in step S54, the reception control unit 26 determines whether or not to set the demodulation stop mode in step S56.

If the reception control unit 26 determines to set the demodulation stop mode in step S56, the reception control unit 26 controls the analog unit 22 to the demodulation unit 24 effective during normal operation to stop the demodulation in step S57, and then the process proceeds to step S59.

For example, the reception control unit 26 causes the analog unit 22 to operate as usual and causes the demodulation unit 23 effective during preliminary operation and the demodulation unit 24 effective during normal operation to execute the function stopping process to stop the demodulation. As a result, for example, the execution of the process of steps S13 to S22 of the demodulation process described with reference to FIG. 13 is stopped in the section set to the demodulation stop mode in the frame of the broadcast signal.

The reception control unit 26 also controls the clock control unit 27 to individually supply the clocks as usual to each components of the receiver 11, execute the clock supply stopping process, or execute the clock frequency reduction process.

Note that in this case, the targets of the stop of the supply of clock or the reduction of the frequency of the supplied clock may be the demodulation unit 23 effective during preliminary operation and the demodulation unit 24 effective during normal operation, and the reception control unit 26 may also be the target of the reduction of the frequency of the supplied clock. It is also possible to reduce the frequency of the clock supplied to the demodulation unit 23 effective during preliminary operation and stop the supply of the clock to the demodulation unit 24 effective during normal operation, for example.

Similarly, the reception control unit 26 controls the power source control unit 29 to individually supply the power source as usual to each components of the receiver 11, execute the power supply stopping process, or execute the power supply voltage reduction process.

Note that in this case, the targets of the stop of the supply of power source or the reduction of the voltage of supplied power may be the demodulation unit 23 effective during preliminary operation and the demodulation unit 24 effective during normal operation, and the reception control unit 26 may also be the target of the reduction of the voltage of supplied power. It is also possible to reduce the voltage of the power supplied to the demodulation unit 23 effective during preliminary operation and stop the power supplied to the demodulation unit 24 effective during normal operation, for example.

Furthermore, if the reception control unit 26 determines not to set the demodulation stop mode, that is, if the reception control unit 26 determines to set the demodulation preliminary mode, in step S56, the reception control unit 26 controls the analog unit 22 to the demodulation unit 24 effective during normal operation to perform the demodulation preliminary operation in step S58, and then the process proceeds to step S59.

For example, the reception control unit 26 causes the analog unit 22 and the demodulation unit 23 effective during preliminary operation to operate as usual to perform the demodulation preliminary operation and causes the demodulation unit 24 effective during normal operation to execute the function stopping process. As a result, for example, the process of steps S11 to S18 of the demodulation process described with reference to FIG. 13 is executed, and the execution of the subsequent process of steps S19 to S22 is stopped in the section set to the demodulation preliminary mode in the frame of the broadcast signal.

The reception control unit 26 also controls the clock control unit 27 to supply the clock to the demodulation unit 24 effective during normal operation as usual, execute the clock supply stopping process, or execute the clock frequency reduction process. Similarly, the reception control unit 26 controls the power source control unit 29 to supply the power source to the demodulation unit 24 effective during normal operation as usual, execute the power supply stopping process, or execute the power supply voltage reduction process.

Note that in this case, the clock and the power source are supplied as usual to the blocks that operate as usual, such as the analog unit 22, the demodulation unit 23 effective during preliminary operation, and the reception control unit 26.

When the process of step S55, step S57, or step S58 is executed, and the operation in each demodulation mode is performed, the reception control unit 26 determines whether or not all of the sections of the frame to be processed in the broadcast signal are processed in step S59.

If the reception control unit 26 determines that all of the sections are not yet processed in step S59, the process returns to step S54, and the process described above is repeated.

On the other hand, if the reception control unit 26 determines that all of the sections are processed in step S59, the demodulation of the frame to be processed is finished, and the demodulation control process ends. In this case, if there is a next frame, the demodulation control process is started for the next frame.

In this way, the receiver 11 decides the demodulation mode for each section of the frame of the broadcast signal based on the signaling information, on the basis of subframes or OFDM symbols. The receiver 11 appropriately stops the demodulation or performs the demodulation preliminary operation according to the decision. As a result, the power consumption of the receiver 11 can be reduced, and the deterioration of the demodulation performance can be reduced.

Modification 1 of First Embodiment

<Decision of Demodulation Mode>

Incidentally, during the demodulation, the receiver 11 estimates the transmission path characteristics of the broadcast signal or performs noise estimation that is estimation of the state of noise included in the broadcast signal.

In a case where the demodulation preliminary operation is performed, the length of the demodulation preliminary operation section sufficient to reduce the deterioration of the demodulation performance is also changed by the channel state, that is, the state of the transmission path, such as whether there is a change in the transmission path characteristics, or the state of noise, such as an amount of noise included in the broadcast signal. Therefore, the receiver 11 may decide the length of the section for performing the demodulation preliminary operation based on the estimation result of the transmission path characteristics or the noise estimation result obtained during the demodulation operation.

Figure 15:
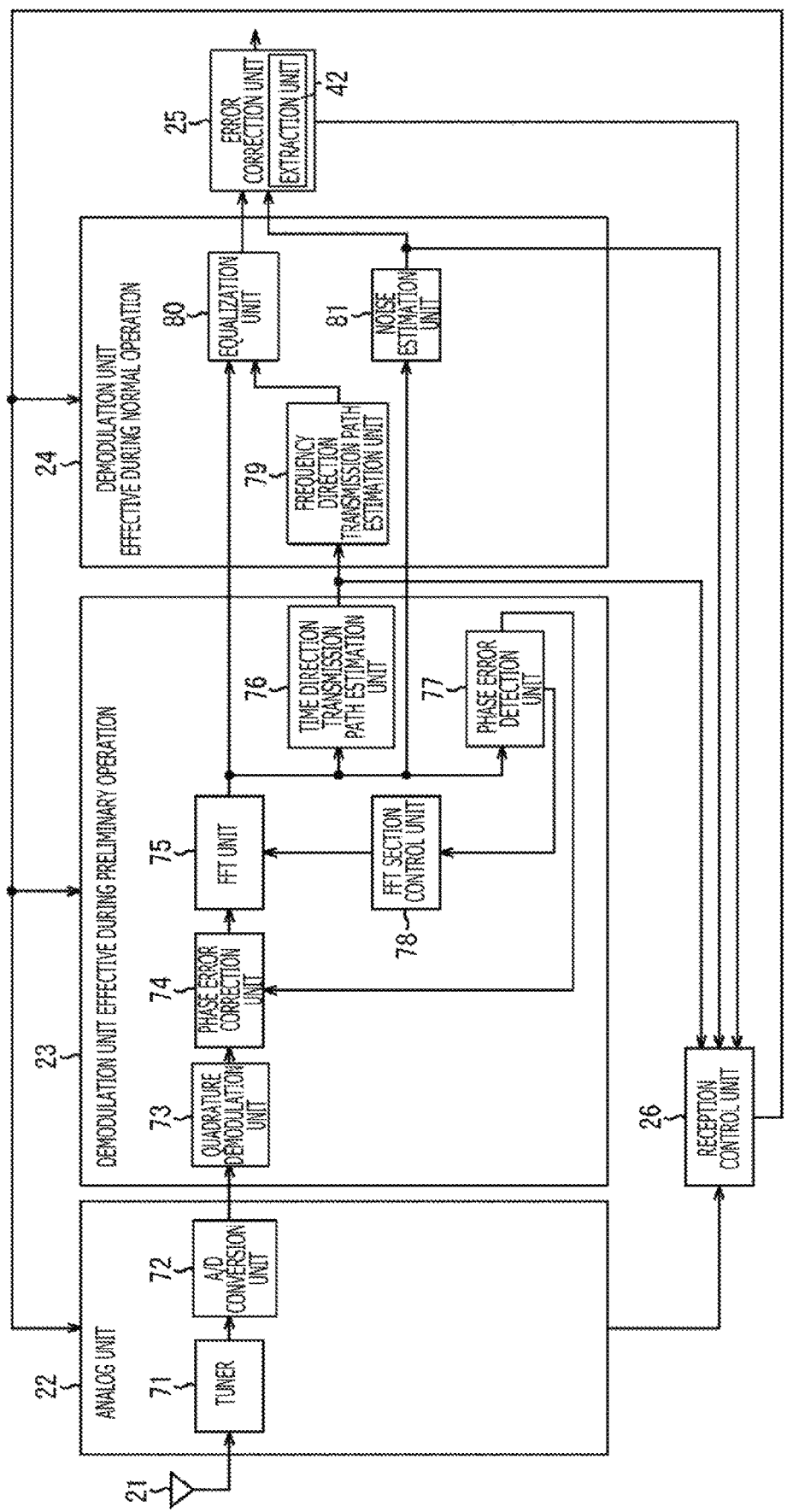
FIG. 15 is a diagram depicting a configuration example of the analog unit to the demodulation unit effective during normal operation.

In such a case, the configuration of the parts of the analog unit 22 to the reception control unit 26 in the receiver 11 is, for example, a configuration as depicted in FIG. 15. Note that in FIG. 15, the same reference signs are provided to the parts corresponding to the case of FIG. 6, and the description will be appropriately omitted.

The configuration of the analog unit 22 to the reception control unit 26 depicted in FIG. 15 is basically the same as the configuration depicted in FIG. 6, and only the time direction transmission estimation unit 76 and the noise estimation unit 81 as well as the relationship of connection with the reception control unit 26 are different.

More specifically, in the example depicted in FIG. 15, the time direction transmission path estimation unit 76 supplies the estimation result of the transmission path characteristics in the time direction not only to the frequency direction transmission path estimation unit 79, but also to the reception control unit 26. In addition, the noise estimation unit 81 supplies the result of the noise estimation not only to the error correction unit 25, but also to the reception control unit 26.

The reception control unit 26 then decides the demodulation mode in each section based on the specification result of the arrangement positions of the reception PLPs in the frame obtained from the signaling information, the estimation result of the transmission path characteristics in the time direction supplied from the time direction transmission path estimation unit 76, and the noise estimation result supplied from the noise estimation unit 81.

Therefore, in step S53 in the demodulation control process described with reference to FIG. 14, the reception control unit 26 uses not only the specification result of the arrangement positions of the reception PLPs, but also the estimation result of the transmission path characteristics in the time direction and the noise estimation result to decide the demodulation mode in each section of the frame of the broadcast signal.

In this case, the length of the section set to the demodulation preliminary mode is longer than the normal length where, for example, the state of the transmission path is poor, such as where the distortion or the variation in the positions of the pilot signals in the time direction is large, or where the broadcast signal includes a large amount of noise, such as where the SN ratio is low.

For example, even when the state of the transmission path is poor, the section for performing the demodulation preliminary operation can be elongated to follow the variation in the transmission path characteristics, and the deterioration of the demodulation performance can be sufficiently reduced. Furthermore, even when, for example, the SN ratio of the broadcast signal is low, the section for performing the demodulation preliminary operation can be elongated to use a larger number of pilot signals to improve the estimation accuracy of the transmission path characteristics or noise, and the deterioration of the demodulation performance can be sufficiently reduced.

Note that the section set to the demodulation preliminary mode may be elongated while the section set to the demodulation stop mode is also provided, or all of the sections set to the demodulation stop mode at the normal time may be set to the demodulation preliminary mode. In addition, the length of the section set to the demodulation preliminary mode can be decided on the basis of at least one of the estimation result of the transmission path characteristics in the time direction and the noise estimation result, and both pieces of information may not be always used.

Furthermore, in a case where the estimation result of the transmission path characteristics in the time direction or the result of the noise estimation is used to decide the demodulation mode, the demodulation mode of each section of the entire frame is decided upon the acquisition of the signaling information in the example described here. However, the example is not limited to this. For example, the length of a section of the demodulation stop mode or the demodulation preliminary mode following a section of the normal demodulation mode just in front of the section of the demodulation stop mode or the demodulation preliminary mode may be decided based on the estimation result of the transmission path characteristics in the time direction or the result of the noise estimation in the section of the normal demodulation mode.

Here, a specific example of selecting the demodulation mode in the subframe of the broadcast signal in the case where the estimation result of the transmission path characteristics in the time direction or the result of the noise estimation is used to decide the demodulation mode will be illustrated.

For example, it is assumed that the subframe with the PLP configuration depicted in FIG. 12 is received. It is also assumed that the PLP A, the PLP D, and the PLP F are reception PLPs, and the length of the section set to the demodulation preliminary mode at the normal time is a length equivalent to four OFDM symbols.

In this case, for example, the reception control unit 26 decides the demodulation mode of each section as described with reference to FIG. 12 at the normal time, that is, when the state of the transmission path is excellent and the SN ratio as a noise state is high. More specifically, the normal demodulation mode is set in the section T31, the demodulation stop mode is set in the section T32, the demodulation preliminary mode is set in the T33, and the normal demodulation mode is set in the section T34.

Figure 16:
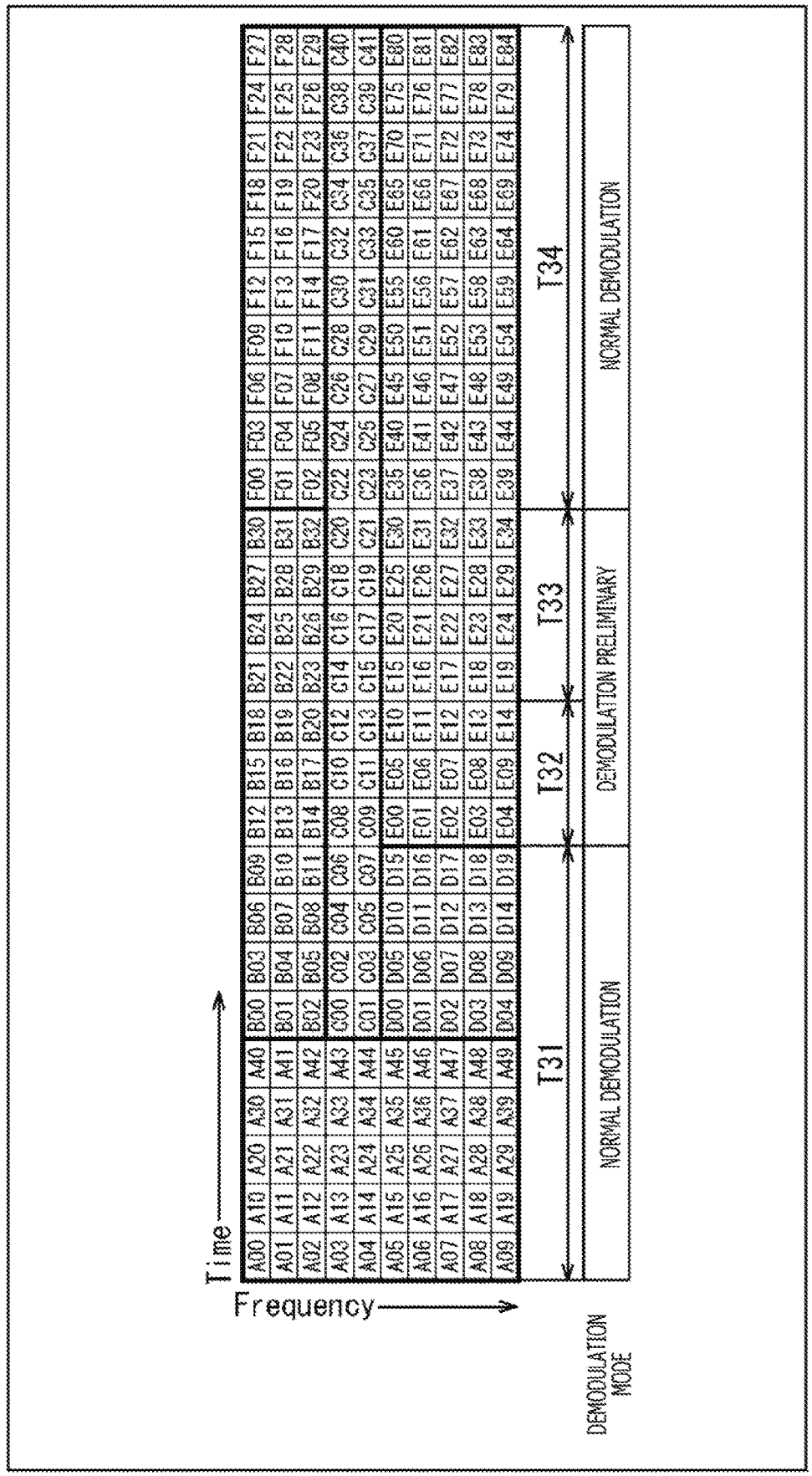
FIG. 16 is a diagram describing an example of selecting the demodulation mode.

On the other hand, in a case where the state of the transmission path is poor or where the SN ratio as a noise state is low, the reception control unit 26 sets the demodulation preliminary mode not only in the section T33, but also in the section T32 as depicted for example in FIG. 16. Note that in FIG. 16, the same characters are provided to the parts corresponding to the case of FIG. 12, and the description will be omitted.

In the example depicted in FIG. 16, the section T32 set to the demodulation stop mode at the normal time is also set to the demodulation preliminary mode. Therefore, the demodulation preliminary mode is set in all of the sections including the section T32 and the section T33 that are sections between the section T31 set to the normal demodulation mode and the section T34 also set to the normal demodulation mode.

In this way, in a case where, for example, the state of the transmission path is poor or where the SN ratio is low, the length of the section set to the demodulation preliminary mode can be set to a length longer than the normal length, or all of the sections set to the demodulation stop mode at the normal time can be set to the demodulation preliminary mode to reduce the deterioration of the demodulation performance.

Second Embodiment

<Demodulation Mode>

Note that in the example described above, the normal demodulation mode, the demodulation stop mode, and the demodulation preliminary mode are prepared as demodulation modes, and one of the three modes is set during the demodulation. In such a case, the analog unit 22 also executes the process for demodulating the broadcast signal in the demodulation stop mode.

On the other hand, the process by the analog unit 22 may also be appropriately stopped when the demodulation is stopped. In such a case, the demodulation mode is one of, for example, the normal demodulation mode, an analog stop mode, an analog restart waiting mode, and the demodulation preliminary mode.

Figure 17:
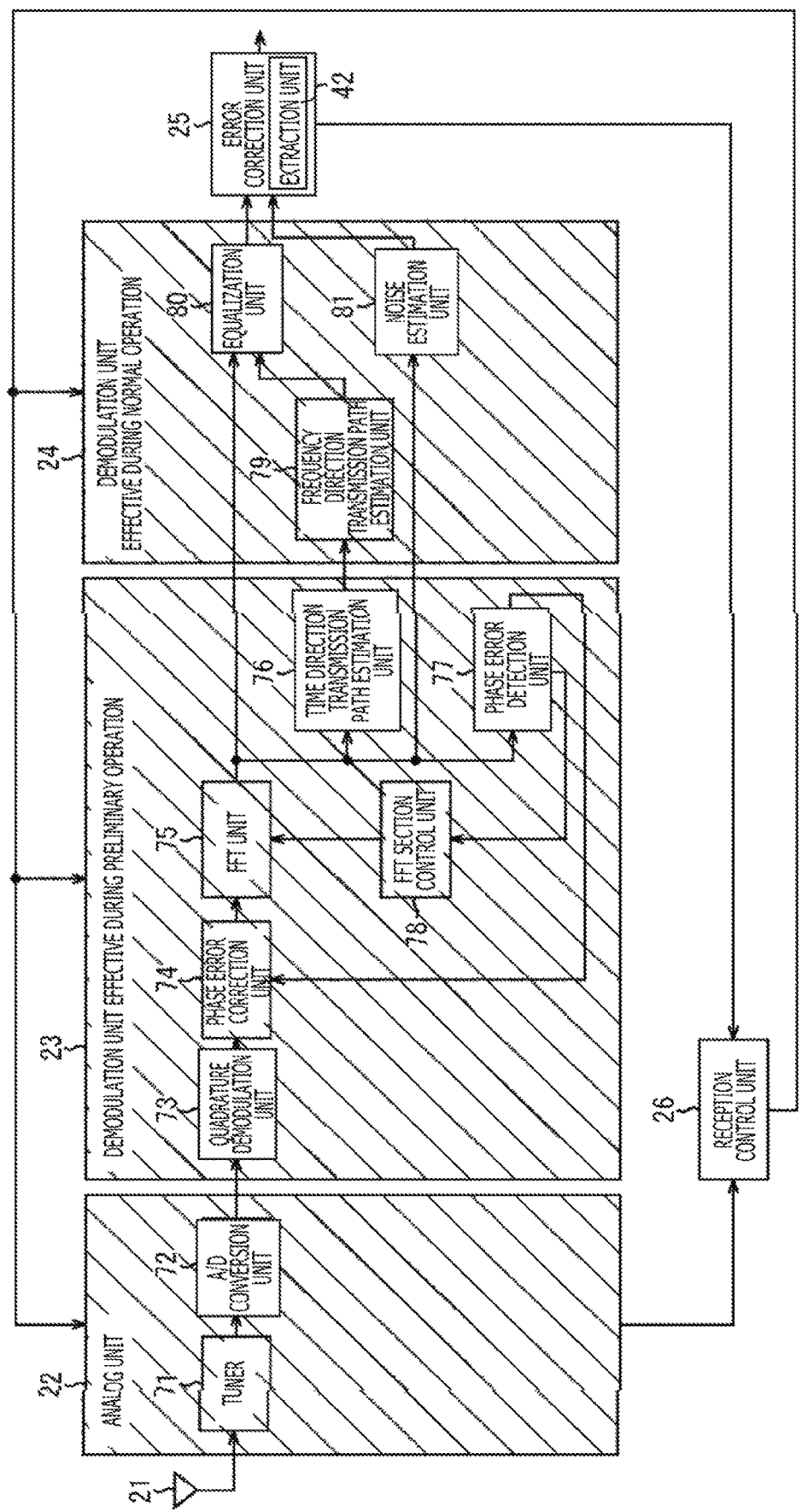
FIG. 17 is a diagram describing an analog stop mode.

Here, in the analog stop mode, the demodulation stopping process stops the operation (demodulation operation) in the analog unit 22, the demodulation unit 23 effective during preliminary operation, and the demodulation unit 24 effective during normal operation as depicted for example in FIG. 17. Note that in FIG. 17, the same reference signs are provided to the parts corresponding to the case of FIG. 6, and the description will be appropriately omitted.

In FIG. 17, blocks provided with diagonal lines indicate the blocks that stop operating, and in this example, the analog unit 22, the demodulation unit 23 effective during preliminary operation, and the demodulation unit 24 effective during normal operation are the blocks that stop operating.

In the analog stop mode, for example, the supply of power source and the supply of clock to the analog unit 22 are stopped, and as a result, each process applied to the broadcast signal that is an analog signal is stopped in the analog unit 22.

In addition, in the analog stop mode, the function stopping process is executed by the demodulation unit 23 effective during preliminary operation and the demodulation unit 24 effective during normal operation. Additionally, the clock supply stopping process, the clock frequency reduction process, the power supply stopping process, and the power supply voltage reduction process may be appropriately and individually executed for the demodulation unit 23 effective during preliminary operation and the demodulation unit 24 effective during normal operation in the analog stop mode. The clock frequency reduction process and the power supply voltage reduction process may also be executed for the reception control unit 26.

Furthermore, in the analog restart waiting mode, the analog unit 22 operates as usual, and the demodulation stopping process stops the operation (demodulation operation) of the demodulation unit 23 effective during preliminary operation and the demodulation unit 24 effective during normal operation, just like the demodulation stop mode as depicted for example in FIG. 8.

Therefore, the demodulation stop mode is further divided into the analog stop mode and the analog restart waiting mode in the example to control the demodulation.

Figure 18:
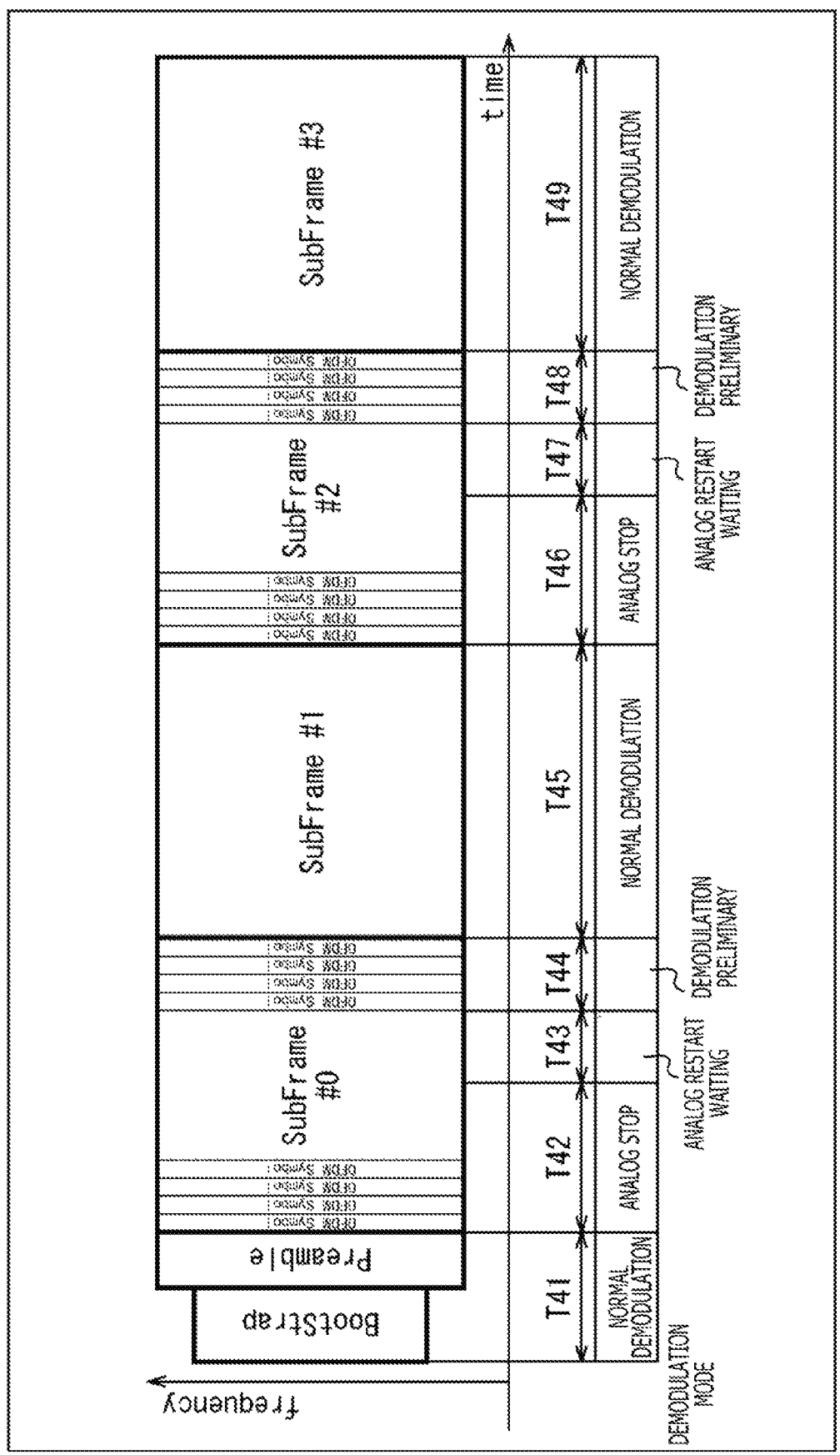
FIG. 18 is a diagram describing an example of selecting the demodulation mode.

In this way, in a case where the operation defined by the normal demodulation mode, the analog stop mode, the analog restart waiting mode, or the demodulation preliminary mode is performed in each section, the demodulation mode of each section is decided as depicted for example in FIG. 18. Note that in FIG. 18, the same characters are provided to the parts corresponding to the case of FIG. 10, and the description will be appropriately omitted.

In the example depicted in FIG. 18, it is assumed that the subframe #1 and the subframe #3 include reception PLPs, and the subframe #0 and the subframe #2 do not include reception PLPs. It is also assumed that the length of the section for performing the demodulation preliminary operation is a section with a length equivalent to four OFDM symbols.

In such a case, the reception control unit 26 executes the demodulation process in the normal demodulation mode in a section T41 at the top of the frame including the bootstrap signal and the preamble signal.

The reception control unit 26 sets the analog stop mode in a section T42 following the section T41 and including part of the OFDM symbols of the subframe #0 without reception PLPs and sets the analog restart waiting mode in a section T43 following the section T42.

More specifically, of the section for stopping the demodulation, the section T43 with a predetermined time length from the removal of the stop of the function of the analog unit 22 to the end of the section for stopping the demodulation is the section of the analog restart waiting mode that is a waiting period for stable operation of the analog unit 22.

The length of the section T43 in the analog restart waiting mode is, for example, a time period with a length necessary for the analog unit 22 to perform stable operation again when the analog unit 22 returns (restarts) from the state in which the function is stopped, that is, the state in which the power supply is shut off. The length of the section in the analog restart waiting mode is not based on the OFDM symbols, but is, for example, a time period with a predetermined fixed length.

Furthermore, the reception control unit 26 sets the demodulation preliminary mode in a section T44 in the subframe #0 following the section T43 and including four OFDM symbols just in front of the subframe #1 with reception PLPs and sets the normal demodulation mode in a subsequent section T45 including the subframe #1 with reception PLPs.

Thereafter, similarly, the reception control unit 26 sets the analog stop mode in a section T46 including part of the OFDM symbols of the subframe #2 without reception PLPs and sets the analog restart waiting mode in a subsequent section T47 with a fixed time length. The reception control unit 26 further sets the demodulation preliminary mode in a section T48 including four OFDM symbols after the section T47 and sets the normal demodulation mode in a section T49 including the subframe #3 with reception PLPs.

Note that in a case where, for example, the section between the section set to the normal demodulation mode and the section set to the demodulation preliminary mode is not a section with a sufficient length, the entire section may be a section in the analog restart waiting mode, instead of providing the section in the analog stop mode and the section in the analog restart waiting mode in the section.

<Description of Demodulation Control Process>

Figure 19:
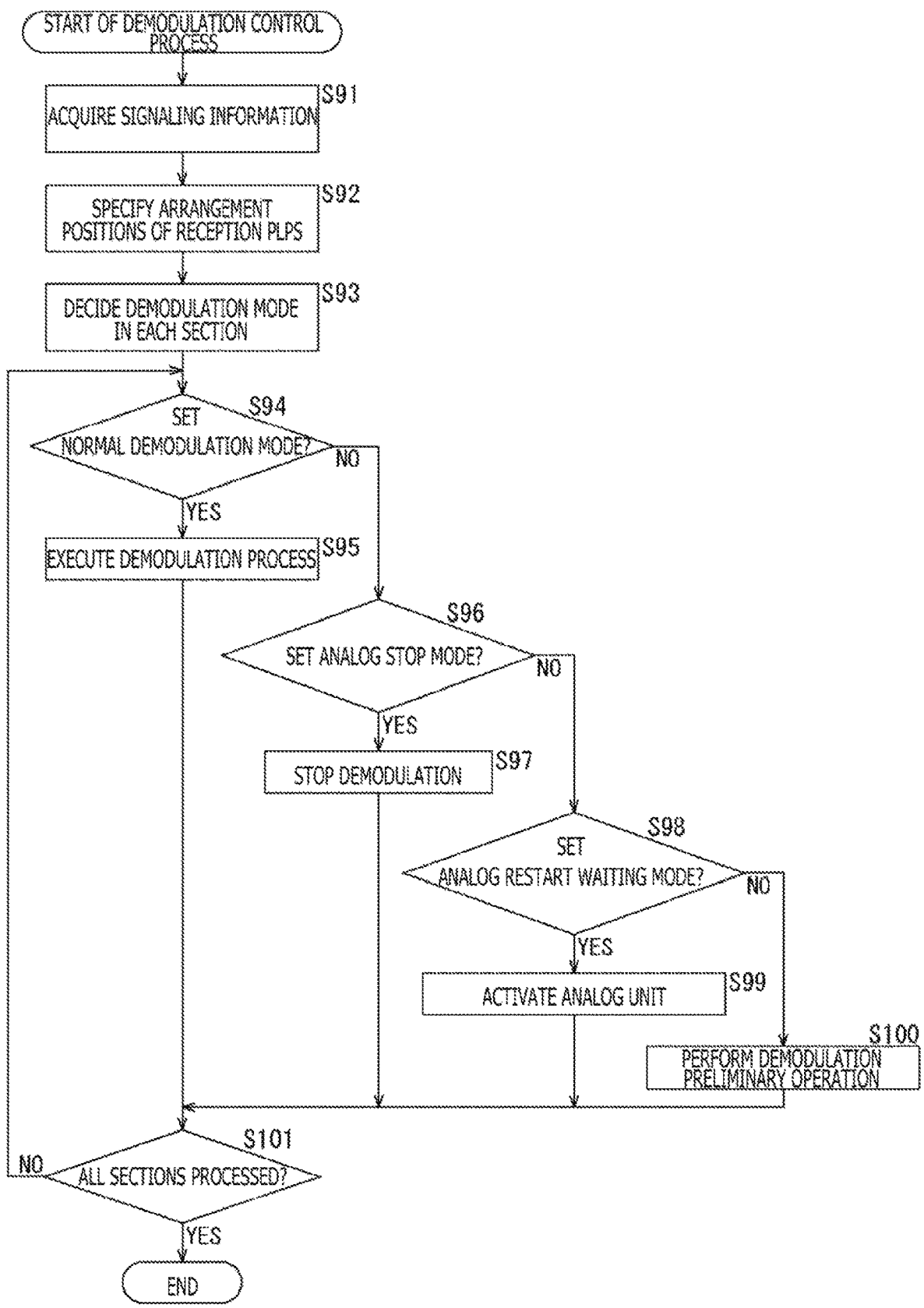
FIG. 19 is a flow chart describing a demodulation control process.

Next, a demodulation control process executed by the receiver 11 when one of the normal demodulation mode, the analog stop mode, the analog restart waiting mode, and the demodulation preliminary mode is selected as a demodulation mode in each section will be described with reference to a flow chart of FIG. 19.

Note that the receiver 11 here is configured as depicted in FIGS. 5 and 6. In this case, the demodulation control process is executed for each frame of the broadcast signal, and the demodulation process described with reference to FIG. 13 is also executed.

Figure 14:
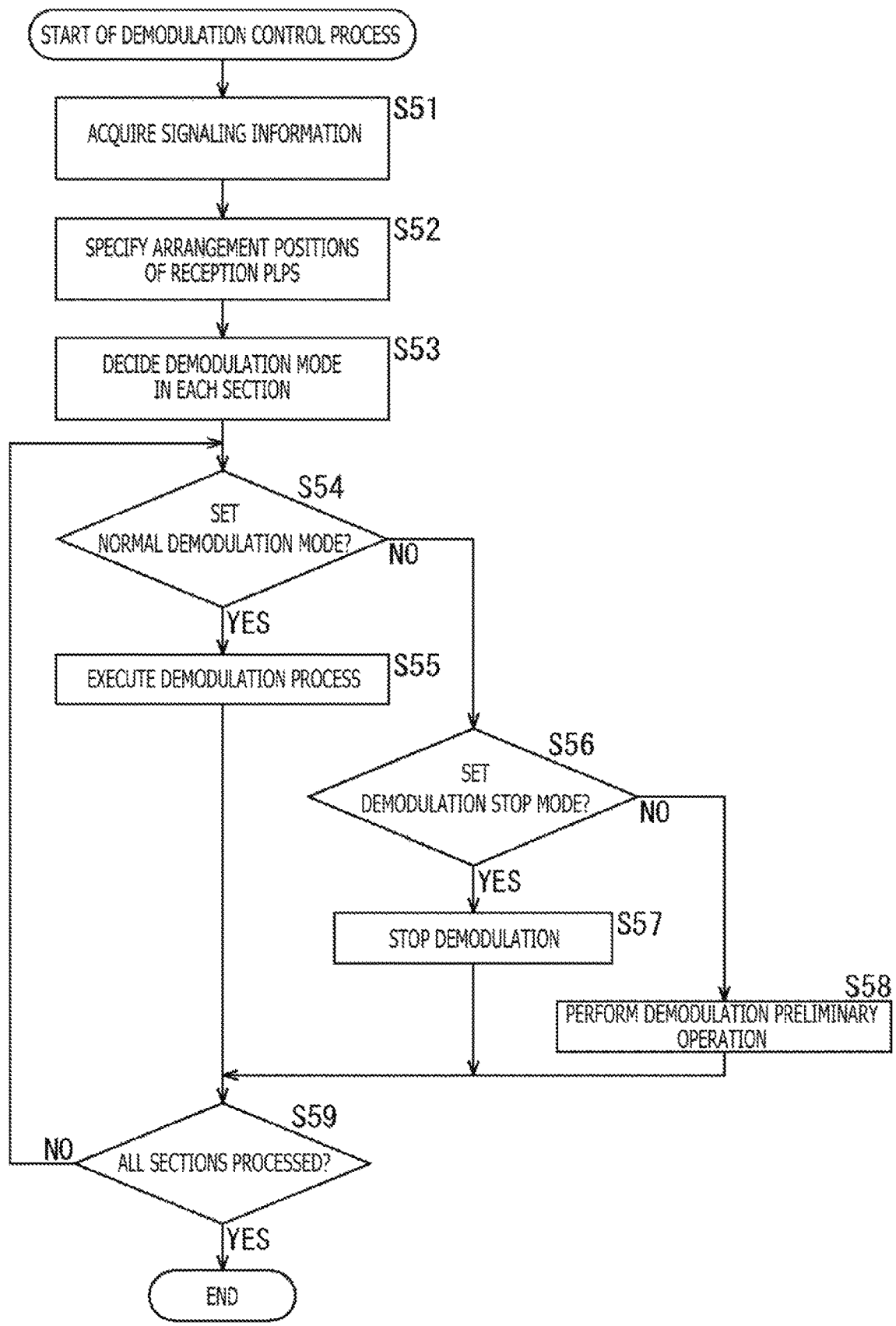
FIG. 14 is a flow chart describing a demodulation control process.

Although a process of steps S91 to S95 is executed when the demodulation control process is started, the process of steps S91 to S95 is similar to the process of steps S51 to S55 in FIG. 14, and the description will be omitted.

However, which one of the normal demodulation mode, the analog stop mode, the analog restart waiting mode, and the demodulation preliminary mode is to be set in each section in the frame is decided in step S93 as described with reference to FIG. 18, for example.

Furthermore, if the reception control unit 26 determines not to set the normal demodulation mode in step S94, the reception control unit 26 determines whether or not to set the analog stop mode in step S96.

If the reception control unit 26 determines to set the analog stop mode in step S96, the reception control unit 26 controls each components of the receiver 11 to stop the demodulation in step S97, and the process then proceeds to step S101.

For example, the reception control unit 26 controls the clock control unit 27 and the power source control unit 29 to stop the supply of clock and the supply of power source to the analog unit 22 to thereby stop the function of the analog unit 22. The reception control unit 26 also causes the demodulation unit 23 effective during preliminary operation and the demodulation unit 24 effective during normal operation to execute the function stopping process to stop the demodulation.

In this case, the execution of the process of steps S11 to S22 in the demodulation process described with reference to FIG. 13 is stopped in, for example, the section set to the analog stop mode in the frame of the broadcast signal.

Note that in this case, the stop of the supply of clock, the reduction of the frequency of the supplied clock, the stop of the supply of power source, the reduction of the voltage of the supplied power source, and the like may be individually performed for the demodulation unit 23 effective during preliminary operation and the demodulation unit 24 effective during normal operation as in the case of step S57 in FIG. 14. The reduction of the frequency of the supplied clock and the reduction of the voltage of the supplied power source may also be performed for the reception control unit 26.

On the other hand, if the reception control unit 26 determines not to set the analog stop mode in step S96, the reception control unit 26 determines whether or not to set the analog restart waiting mode in step S98.

If the reception control unit 26 determines to set the analog restart waiting mode in step S98, the reception control unit 26 causes the analog unit 22 to perform normal operation and causes the demodulation unit 23 effective during preliminary operation and the demodulation unit 24 effective during normal operation to execute the function stopping process in step S99 to maintain the stopped state of the demodulation. After the execution of the process of step S99, the process proceeds to step S101.

In step S99, the reception control unit 26 controls the clock control unit 27 and the power source control unit 29 to resume the supply of clock and the supply of power source to the analog unit 22 and controls the demodulation unit 23 effective during preliminary operation and the demodulation unit 24 effective during normal operation to execute the function stopping process.

In this case, the process of steps S11 and S12 of the demodulation process described with reference to FIG. 13 is resumed, and the stop of the execution of the process of steps S13 to S22 is maintained in, for example, the section set to the analog restart waiting mode in the frame of the broadcast signal.

In this case, the reception control unit 26 may also individually stop the supply of clock, reduce the frequency of the supplied clock, stop the supply of power source, or reduce the voltage of the supplied power source for the demodulation unit 23 effective during preliminary operation and the demodulation unit 24 effective during normal operation as in the case of step S57 in FIG. 14. The reduction of the frequency of the supplied clock and the reduction of the voltage of the supplied power source may also be performed for the reception control unit 26.

Furthermore, if the reception control unit 26 determines not to set the analog restart waiting mode in step S98, that is, if the reception control unit 26 determines to set the demodulation preliminary mode, the reception control unit 26 controls the analog unit 22 to the demodulation unit 24 effective during normal operation to perform the demodulation preliminary operation in step S100, and the process then proceeds to step S101. Note that the process of step S100 is similar to the process of step S58 in FIG. 14, and the description will be omitted.

When the process of step S95, step S97, step S99, or step S100 is executed, and the operation in each demodulation mode is performed, the reception control unit 26 determines whether or not all of the sections of the frame to be processed in the broadcast signal are processed in step S101.

If the reception control unit 26 determines that all of the sections are not processed yet in step S101, the process returns to step S94, and the process described above is repeated.

On the other hand, if the reception control unit 26 determines that all of the sections are processed in step S101, the demodulation of the frame to be processed is finished, and the demodulation control process ends. In this case, if there is a next frame, the demodulation control process is started for the next frame.

In this way, the receiver 11 decides the demodulation mode for each section of the frame of the broadcast signal based on the signaling information. The receiver 11 appropriately stops the demodulation or performs the demodulation preliminary operation according to the decision. As a result, the power consumption of the receiver 11 can be reduced, and the deterioration of the demodulation performance can be reduced.

In this way, according to the present technique, the power consumption during the demodulation can be reduced in the receiver that receives and demodulates the broadcast signal, and the deterioration of the demodulation performance can be reduced.

For example, compared to a case of executing the demodulation process as in the usual method (hereinafter, also referred to as normal method), the supply of clock or power source and the demodulation are controlled on the basis of subframes or OFDM symbols in the method according to the present technique. Therefore, an unnecessary signal is not demodulated, and the power consumption can be reduced.

Figure 20:
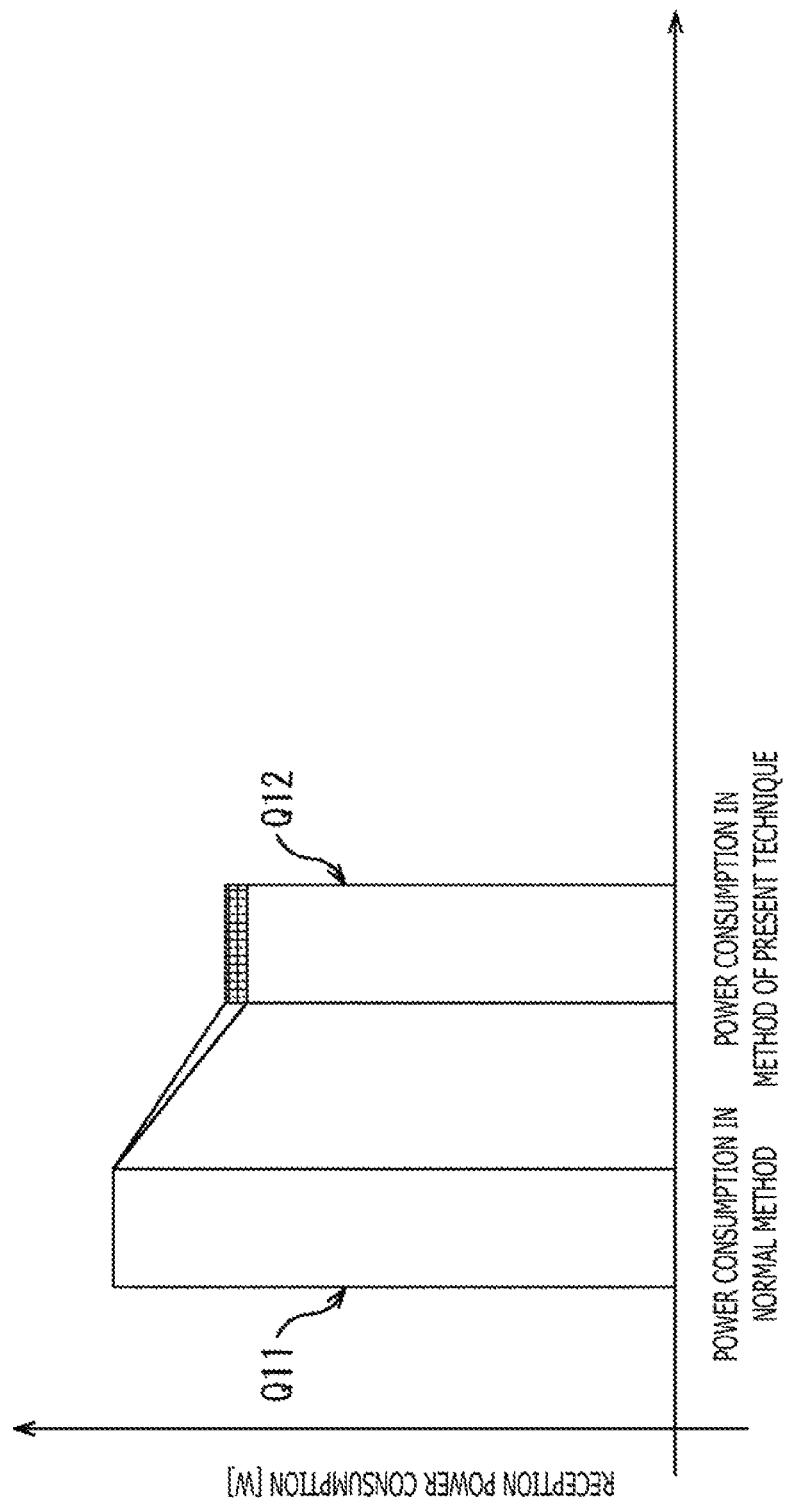
FIG. 20 is a diagram describing reduction of power consumption according to the present technique.

Specifically, for example, the reception PLPs include 70% of the OFDM symbols in the frame, and the method according to the present technique is used to appropriately stop the demodulation, the supply of clock, and the supply of power source. In this case, the power consumption can be significantly reduced as depicted in FIG. 20. Note that the vertical axis in FIG. 20 indicates the power consumption during the demodulation. Particularly, an arrow Q11 indicates the power consumption in the normal method, and an arrow Q12 indicates the power consumption in the method of the present technique.

In FIG. 20, a part without diagonal lines in the power consumption indicated by the arrow Q12 denotes the power consumption by the analog unit 22 to the demodulation unit 24 effective during normal operation, and a part with diagonal lines denotes the power consumption by the reception control unit 26.

In the example, the method of the present technique can reduce the power consumption of the analog unit 22 to the demodulation unit 24 effective during normal operation to approximately 70% of the power consumption in the normal method. Even after adding the increase in the power consumption by the reception control unit 26 indicated by the part with diagonal lines, it can be understood that the method of the present technique can significantly reduce the power consumption as a whole compared to the normal method.

Furthermore, compared to where the supply of clock and the supply of power source are controlled and the demodulation preliminary operation is not performed, the clock error caused by the change in the temperature in the chip and the deterioration of the demodulation performance due to the variation in the transmission path characteristics can be reduced where the supply of clock and the supply of power source are controlled and the demodulation preliminary operation is performed. Therefore, the clock errors can be reduced, and the transmission path estimation can be followed to improve the demodulation performance just after the return from the stop of demodulation. Furthermore, the deterioration of the demodulation performance can also be reduced compared to where the supply of clock and the supply of power source are not controlled on the basis of subframes.

For example, a clock supply source with a small amount of clock errors caused by temperature characteristics may be more expensive. However, when the method of the present technique is used to appropriately reduce the power consumption and correct the phase error, an inexpensive clock supply source (oscillator) can be selected, and a reception system can be constructed at a low cost and low power consumption. Furthermore, according to the method of the present technique, a reception system can be constructed at low power consumption and high demodulation performance even under an environment with sudden variations in the transmission path characteristics.

Incidentally, the series of processes can be executed by hardware and can be executed by software. In a case where the series of processes are executed by software, a program constituting the software is installed on a computer. Here, examples of the computer include a computer incorporated into dedicated hardware and a general-purpose computer that can execute various functions by installing various programs.

Figure 21:
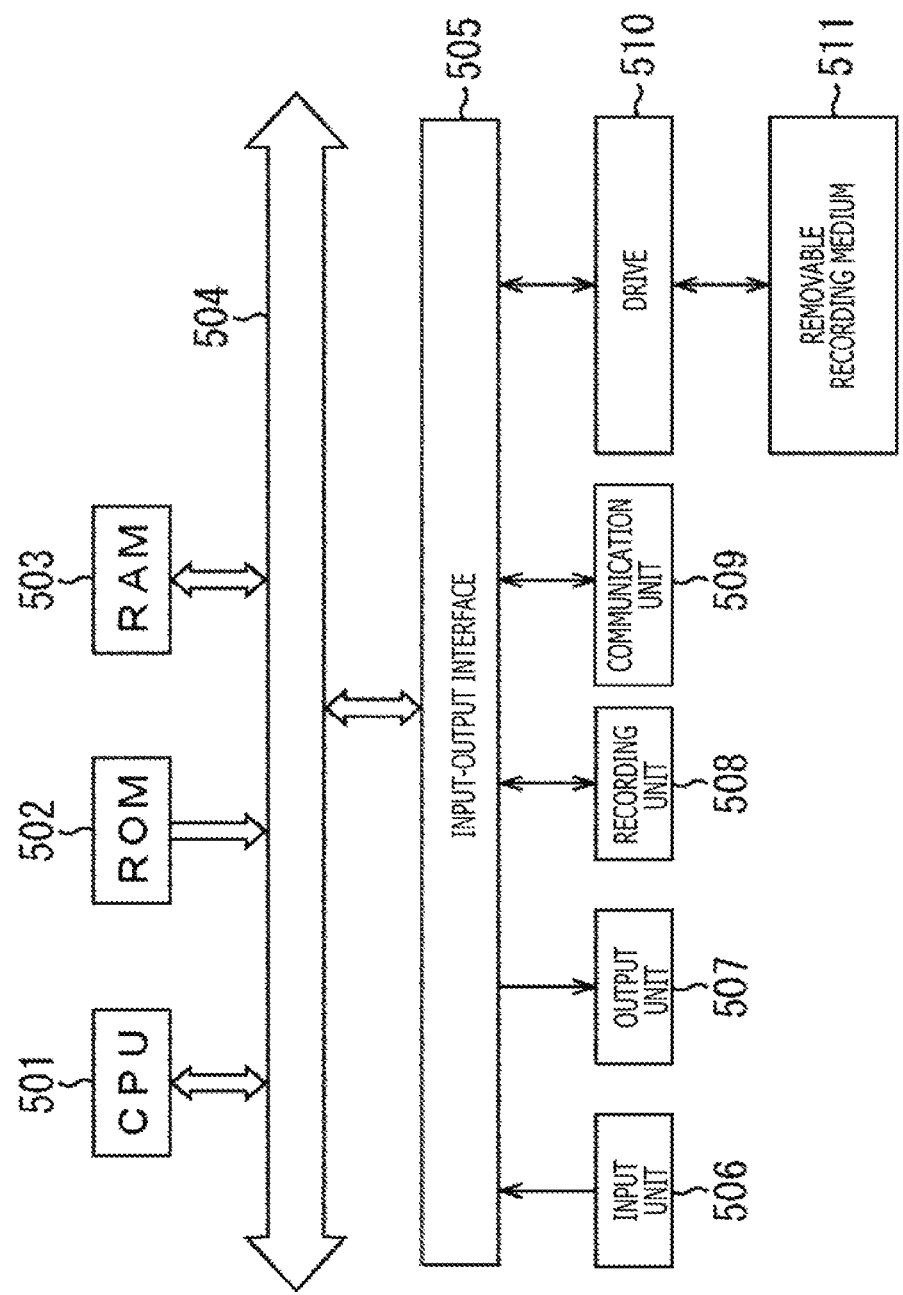
FIG. 21 is a diagram depicting a configuration example of a computer.

FIG. 21 is a block diagram depicting a configuration example of hardware of a computer that uses a program to execute the series of processes described above.

In the computer, a CPU (Central Processing Unit) 501, a ROM (Read Only Memory) 502, and a RAM (Random Access Memory) 503 are connected to each other by a bus 504.

An input-output interface 505 is further connected to the bus 504. An input unit 506, an output unit 507, a recording unit 508, a communication unit 509, and a drive 510 are connected to the input-output interface 505.

The input unit 506 includes a keyboard, a mouse, a microphone, an imaging device, and the like. The output unit 507 includes a display, a speaker, and the like. The recording unit 508 includes a hard disk, a non-volatile memory, and the like. The communication unit 509 includes a network interface and the like. The drive 510 drives a removable recording medium 511, such as a magnetic disk, an optical disk, a magneto-optical disk, and a semiconductor memory.

In the computer configured in this way, the CPU 501 loads a program recorded in a recording unit 508 on the RAM 503 through the input-output interface 505 and the bus 504 and executes the program to execute the series of processes, for example.

The program executed by the computer (CPU 501) can be provided by, for example, recording the program in the removable recording medium 511 as a package medium or the like. The program can also be provided through a wired or wireless transmission medium, such as a local area network, the Internet, and digital satellite broadcasting.

In the computer, the removable recording medium 511 can be mounted on the drive 510 to install the program on the recording medium 508 through the input-output interface 505. The program can also be received by the communication unit 509 through a wired or wireless transmission medium and installed on the recording unit 508. Furthermore, the program can be installed in advance in the ROM 502 or the recording unit 508.

Note that the program executed by the computer may be a program for executing the processes in chronological order described in the present specification or may be a program for executing the processes in parallel or at a necessary timing such as when the program is invoked.

Furthermore, the embodiments of the present technique are not limited to the embodiments described above, and various changes can be made without departing from the scope of the present technique.

For example, the present technique can be configured as cloud computing in which a plurality of apparatuses take charge and cooperate to process one function through a network.

In addition, one apparatus can execute each step described in the flow charts, or a plurality of apparatuses can take charge and execute each step.

Furthermore, in a case where one step includes a plurality of processes, one apparatus can execute the plurality of processes included in one step, or a plurality of apparatuses can take charge and execute the processes.

The advantageous effects described in the present specification are exemplary only and not limiting, and there can be other advantageous effects.

Furthermore, the present technique can be configured as follows.

(1)

A signal processing apparatus including:

a demodulation unit that demodulates a received signal including a plurality of pieces of multiplexed data; and a reception control unit that stops the demodulation by the demodulation unit in a section not including necessary data in the received signal on the basis of subframes or OFDM symbols constituting a frame of the received signal.

(2)

The signal processing apparatus according to (1), further including:

an extraction unit that extracts, from the received signal, signaling information for specifying arrangement of the data in the received signal, in which the reception control unit decides the section for stopping the demodulation on the basis of the signaling information.

(3)

The signal processing apparatus according to (1) or (2), in which the reception control unit stops the demodulation by stopping at least part of a process in the demodulation unit.

(4)

The signal processing apparatus according to any one of (1) to (3), in which the reception control unit stops the demodulation by stopping supply of a clock supplied to at least part of the demodulation unit or by reducing a frequency of the clock.

(5)

The signal processing apparatus according to any one of (1) to (4), in which the reception control unit stops the demodulation by stopping supply of a power source supplied to at least part of the demodulation unit or by reducing a voltage of the power source.

(6)

The signal processing apparatus according to any one of (1) to (5), in which the reception control unit reduces a frequency of a clock supplied to the reception control unit in the section for stopping the demodulation.

(7)

The signal processing apparatus according to any one of (1) to (6), in which the reception control unit reduces a voltage of a power source supplied to the reception control unit in the section for stopping the demodulation.

(8)

The signal processing apparatus according to any one of (1) to (7), in which in a section not including necessary data just in front of a section for performing the demodulation, the reception control unit causes the demodulation unit to execute, as a demodulation preliminary operation, at least one of a process of correcting a phase error of the received signal and a process of estimating transmission path characteristics of the received signal among processes of demodulating the received signal.

(9)

The signal processing apparatus according to (8), in which the reception control unit decides a length of the section of the demodulation preliminary operation on the basis of at least one of an estimation result of the transmission path characteristics and an estimation result of noise included in the received signal.

(10)

The signal processing apparatus according to (8) or (9), in which, in a case where the reception control unit causes the demodulation unit to execute the demodulation preliminary operation, the reception control unit stops supply of a clock to a later-stage block in a later stage of a block that executes the demodulation preliminary operation in the demodulation unit or reduces a frequency of the clock supplied to the later-stage block.

(11)

The signal processing apparatus according to any one of (8) to (10), in which, in a case where the reception control unit causes the demodulation unit to execute the demodulation preliminary operation, the reception control unit stops supply of a power source to a later-stage block in a later stage of a block that executes the demodulation preliminary operation in the demodulation unit or reduces a voltage of the power source supplied to the later-stage block.

(12)

The signal processing apparatus according to any one of (1) to (11), in which the reception control unit controls the demodulation unit to stop a process applied to the received signal that is an analog signal among processes of demodulating the received signal in the section for stopping the demodulation.

(13)

The signal processing apparatus according to (12), in which, after controlling the demodulation unit to stop, in the section for stopping the demodulation, the process applied to the received signal that is the analog signal, the reception control unit causes the demodulation unit to execute, in a section with a predetermined time length up to an end of the section for stopping the demodulation, the process applied to the received signal that is the analog signal.

(14)

A signal processing method including the steps of:

demodulating a received signal including a plurality of pieces of multiplexed data; and stopping the demodulation by the demodulation unit in a section not including necessary data in the received signal on the basis of subframes or OFDM symbols constituting a frame of the received signal.

(15)

A program causing a computer to execute a process including the steps of:

demodulating a received signal including a plurality of pieces of multiplexed data; and stopping the demodulation by the demodulation unit in a section not including necessary data in the received signal on the basis of subframes or OFDM symbols constituting a frame of the received signal.

REFERENCE SIGNS LIST

11 Receiver, 22 Analog unit, 23 Demodulation unit effective during preliminary operation, 24 Demodulation unit effective during normal operation, 26 Reception control unit, 41 Demodulation unit, 42 Extraction unit, 74 Phase error correction unit, 76 Time direction transmission path estimation unit, 77 Phase error detection unit

The invention claimed is:

1. A signal processing apparatus, comprising:
a central processing unit (CPU) configured to:
demodulate a received signal including a plurality of pieces of multiplexed data, wherein the received signal comprises a frame, the frame comprises a plurality of subframes, and at least one subframe of the plurality of subframes is divided into a plurality of subsections based on Orthogonal Frequency Division Multiplexing (OFDM) symbols;
determine at least one first subsection of the plurality of subsections for which demodulation is to be stopped, wherein the determination is based on signaling information that indicates that the at least one first subsection does not include data to be received by the signal processing apparatus;
stop the demodulation in the at least one first subsection of the plurality of subsections based on the determination;

continue demodulation in at least one second subsection of the plurality of subsections, wherein
the at least one second subsection of the plurality of subsections includes the data to be received by the signal processing apparatus;
execute a demodulation preliminary operation in at least one third subsection, wherein the demodulation preliminary operation comprises at least one of:
correction of a phase error of the received signal, or estimation of transmission path characteristics of the received signal, wherein the at least one third subsection is in front of the at least one second subsection in which the demodulation is continued; and
set a demodulation preliminary mode in the at least one first subsection in which the demodulation is stopped, such that a length of the demodulation preliminary operation is increased, wherein the demodulation preliminary mode is set in the at least one first subsection based on at least one of the estimation of the transmission path characteristics or an estimation result of noise included in the received signal.

2. The signal processing apparatus according to claim 1, wherein the CPU is further configured to:
extract, from the received signal, the signaling information that specifies arrangement of data in the frame of the received signal.

3. The signal processing apparatus according to claim 1, wherein the CPU is further configured to:
stop at least a part of a demodulation process executed by the CPU; and
stop the demodulation in the at least one first subsection of the plurality of subsections of the at least one subframe based on the stoppage of the at least the part of the demodulation process.

4. The signal processing apparatus according to claim 1, wherein the CPU is further configured to:
one of stop supply of a clock signal to at least a part of the CPU or reduce a frequency of the clock signal supplied to the at least the part of the CPU; and
stop the demodulation in the at least one first subsection of the plurality of subsections of the at least one subframe based on at least one of the stoppage of the supply of the clock signal to the at least the part of the CPU or the reduction of the frequency of the clock signal supplied to the at least the part of the CPU.

5. The signal processing apparatus according to claim 1, wherein the CPU is further configured to:
one of stop supply of power to at least a part of the CPU or reduce a voltage of the power supplied to the at least the part of the CPU; and
stop the demodulation in the at least one first subsection of the plurality of subsections of the at least one subframe based on at least one of the stoppage of the supply of the power to the at least the part of the CPU or the reduction of the voltage of the power.

6. The signal processing apparatus according to claim 1, wherein the CPU is further configured to:
reduce a frequency of a clock signal supplied to at least a part of the CPU; and
stop the demodulation in the at least one first subsection of the plurality of subsections of the at least one subframe based on the reduction.

7. The signal processing apparatus according to claim 1, wherein the CPU is further configured to:
reduce a voltage of power supplied to at least a part of the CPU; and
stop the demodulation in the at least one first subsection of the plurality of subsections of the at least one subframe based on the reduction.

8. The signal processing apparatus according to claim 1, wherein, based on the execution of the demodulation preliminary operation, the CPU is further configured to stop supply of a clock signal to a later-stage block in a later stage of a block that one of executes the demodulation preliminary operation or reduces a frequency of the clock signal supplied to the later-stage block.

9. The signal processing apparatus according to claim 1, wherein, based on the execution of the demodulation preliminary operation, the CPU is further configured to stop supply of power to a later-stage block in a later stage of a block that one of executes the demodulation preliminary operation or reduces a voltage of the power supplied to the later-stage block.

10. The signal processing apparatus according to claim 1, wherein the CPU is further configured to stop a process applied to the at least one first subsection of the at least one subframe in the received signal, wherein
the received signal is an analog signal, and
the process is one of a plurality of processes for the demodulation in the at least one first subsection of the at least one subframe in the received signal.

11. The signal processing apparatus according to claim 10, wherein
based on the stoppage of the process applied to the at least one first subsection of the at least one subframe in the received signal that is the analog signal, the CPU is further configured to execute, in a fourth subsection of the at least one subframe, the process applied to the at least one first subsection of the at least one subframe, and
the fourth subsection has a determined time length up to an end of the at least one first subsection.

12. A signal processing method, comprising:
demodulating a received signal including a plurality of pieces of multiplexed data, wherein the received signal comprises a frame, and the frame comprises a plurality of subframes, and at least one subframe of the plurality of subframes is divided into a plurality of subsections based on Orthogonal Frequency Division Multiplexing (OFDM) symbols;
determining at least one first subsection of the plurality of subsections for which demodulation is to be stopped, wherein the determination is based on signaling information that indicates that the at least one first subsection does not include data to be received by a signal processing apparatus;
stopping the demodulation in the at least one first subsection of the plurality of subsections based on the determination;
continuing the demodulation in at least one second subsection of the plurality of subsections, wherein
the at least one second subsection of the plurality of subsections includes the data to be received by the signal processing apparatus;
executing a demodulation preliminary operation in at least one third subsection, wherein the demodulation preliminary operation comprises at least one of:

correction of a phase error of the received signal, or
estimation of transmission path characteristics of the received signal, wherein the at least one third subsection is in front of the at least one second subsection in which the demodulation is continued; and setting a demodulation preliminary mode in the at least one first subsection in which the demodulation is stopped, such that a length of the demodulation preliminary operation is increased, wherein the demodulation preliminary mode is set in the at least one first subsection based on at least one of the estimation of the transmission path characteristics or an estimation result of noise included in the received signal.

13. A non-transitory computer-readable medium having stored thereon computer-executable instructions that, when executed by a computer, cause the computer to execute operations, the operations comprising:

demodulating a received signal including a plurality of pieces of multiplexed data, wherein the received signal comprises a frame, and the frame comprises a plurality of subframes, and at least one subframe of the plurality of subframes is divided into a plurality of subsections based on Orthogonal Frequency Division Multiplexing (OFDM) symbols;

determining at least one first subsection of the plurality of subsections for which demodulation is to be stopped, wherein the determination is based on signaling information that indicates that the at least one first subsection does not include data to be received by a signal processing apparatus;

stopping the demodulation in the at least one first subsection of the plurality of subsections based on the determination;

continuing the demodulation in at least one second subsection of the plurality of subsections, wherein
the at least one second subsection of the plurality of subsections includes the data to be received by the signal processing apparatus;

executing a demodulation preliminary operation in at least one third subsection, wherein the demodulation preliminary operation comprises at least one of:
correction of a phase error of the received signal, or
estimation of transmission path characteristics of the received signal, wherein the at least one third subsection is in front of the at least one second subsection in which the demodulation is continued; and setting a demodulation preliminary mode in the at least one first subsection in which the demodulation is stopped, such that a length of the demodulation preliminary operation is increased, wherein the demodulation preliminary mode is set in the at least one first subsection based on at least one of the estimation of the transmission path characteristics or an estimation result of noise included in the received signal.

14. The signal processing apparatus according to claim 1, wherein
a division of a first subframe of the plurality of subframes is based on time-division multiplexing, and
a division of a second subframe of the plurality of subframes is based on frequency-division multiplexing.

* * * * *